(12) United States Patent
Sakauchi

(10) Patent No.: US 7,826,400 B2
(45) Date of Patent: Nov. 2, 2010

(54) PACKET RING NETWORK SYSTEM AND PACKET TRANSPORT METHOD

(75) Inventor: Masahiro Sakauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 199 days.

(21) Appl. No.: 12/131,314

(22) Filed: Jun. 2, 2008

(65) Prior Publication Data
US 2008/0316918 A1     Dec. 25, 2008

(30) Foreign Application Priority Data
Jun. 21, 2007     (JP)     ............... JP2007-163660

(51) Int. Cl.
H04L 12/28     (2006.01)

(52) U.S. Cl. .................................. 370/258

(58) Field of Classification Search ............... None
See application file for complete search history.

(56) References Cited

U.S. PATENT DOCUMENTS

| | | | |
|---|---|---|---|
| 7,274,656 B2* | 9/2007 | Lee et al. ..................... | 370/223 |
| 7,545,735 B1* | 6/2009 | Shabtay et al. .............. | 370/217 |
| 7,619,987 B2* | 11/2009 | Mitsumori .................. | 370/254 |
| 2003/0012129 A1* | 1/2003 | Lee et al. ..................... | 370/216 |
| 2003/0021226 A1* | 1/2003 | Mor ............................ | 370/223 |
| 2003/0117946 A1* | 6/2003 | Fontana et al. .............. | 370/216 |
| 2005/0135234 A1* | 6/2005 | Saleh et al. .................. | 370/218 |
| 2005/0201273 A1* | 9/2005 | Shimizu ....................... | 370/216 |
| 2007/0115805 A1* | 5/2007 | Ge et al. ...................... | 370/218 |
| 2007/0165517 A1* | 7/2007 | Binetti et al. ................ | 370/222 |
| 2007/0217331 A1* | 9/2007 | Khanna et al. .............. | 370/224 |
| 2008/0298231 A1* | 12/2008 | Takakuwa .................... | 370/223 |
| 2008/0304407 A1* | 12/2008 | Umansky et al. ............ | 370/222 |
| 2008/0316918 A1* | 12/2008 | Sakauchi ..................... | 370/223 |
| 2009/0040922 A1* | 2/2009 | Umansky et al. ............ | 370/224 |
| 2009/0052317 A1* | 2/2009 | Takagi et al. ................ | 370/223 |
| 2009/0238067 A1* | 9/2009 | Yamauchi .................... | 370/228 |

FOREIGN PATENT DOCUMENTS

| | | |
|---|---|---|
| JP | 10-4424 | 1/1998 |
| JP | 2003-258822 | 9/2003 |
| JP | 2004-242194 | 8/2004 |
| JP | 2006-129071 | 5/2006 |
| WO | WO-2006-092915 | 9/2006 |

OTHER PUBLICATIONS

IEEE STD 802.17-2004 PART 17: Resilient packet ring (RPR) access method & physical layer specification, IEEE (Institute of Electrical and Electronic Engineers, Inc.) pp. 27-54, 211-223 and 379-399.

\* cited by examiner

*Primary Examiner*—Chi H Pham
*Assistant Examiner*—Fan Ng
(74) *Attorney, Agent, or Firm*—Dickstein Shapiro LLP

(57) ABSTRACT

A packet ring network system including a plurality of packet ring networks to which nodes are brought into ring form connection so that a packet inside a ring obtained by encapsulating a client packet, which a terminal outside the packet ring network transmits, is transmitted and received in a packet ring network. A plurality of subpacket ring networks are connected to the first packet ring network through an interlink used for client packet transport therebetween. The interlink is provided to each of the subpacket ring networks connected to the first packet ring network. The first packet ring network and each of the subpacket ring networks include an interlink node connected to an interlink.

23 Claims, 20 Drawing Sheets

F I G. 1
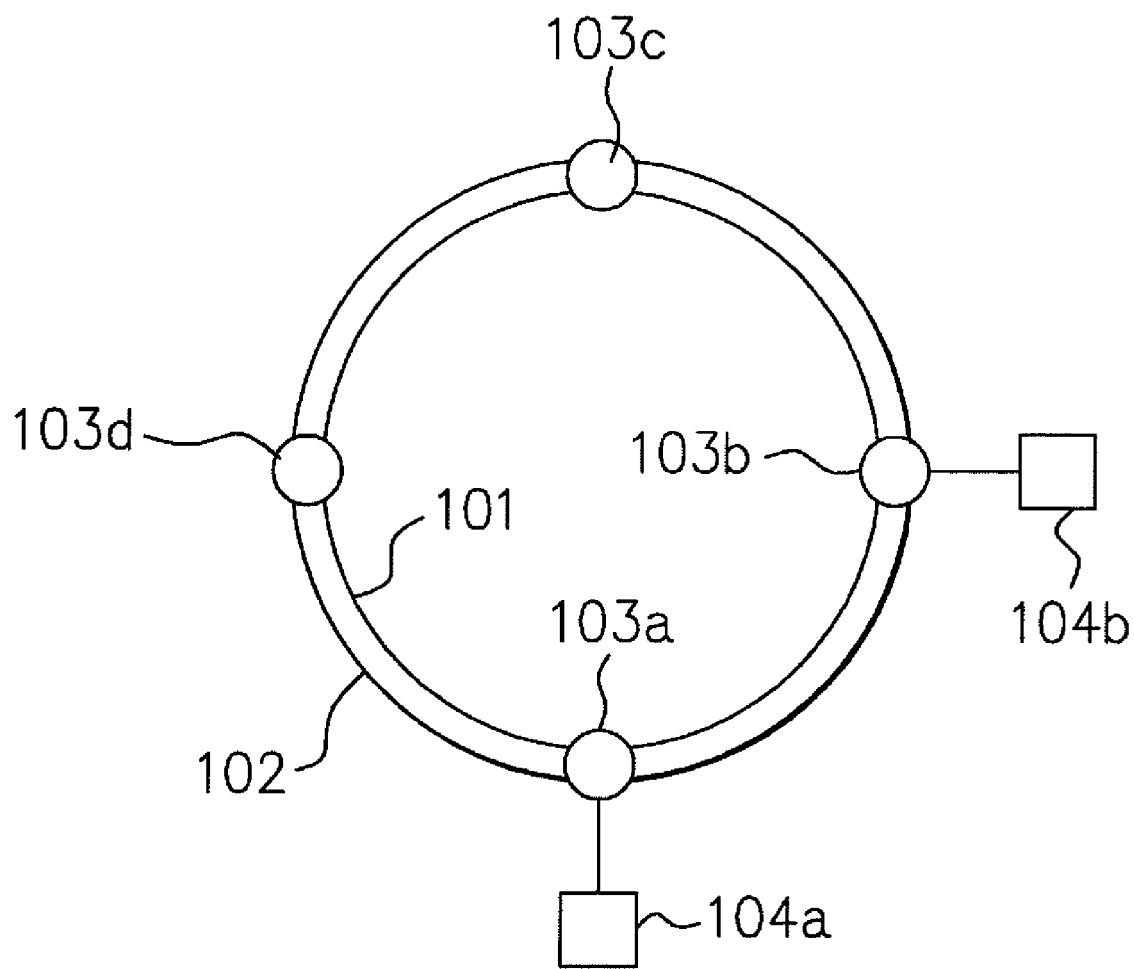

F I G. 5
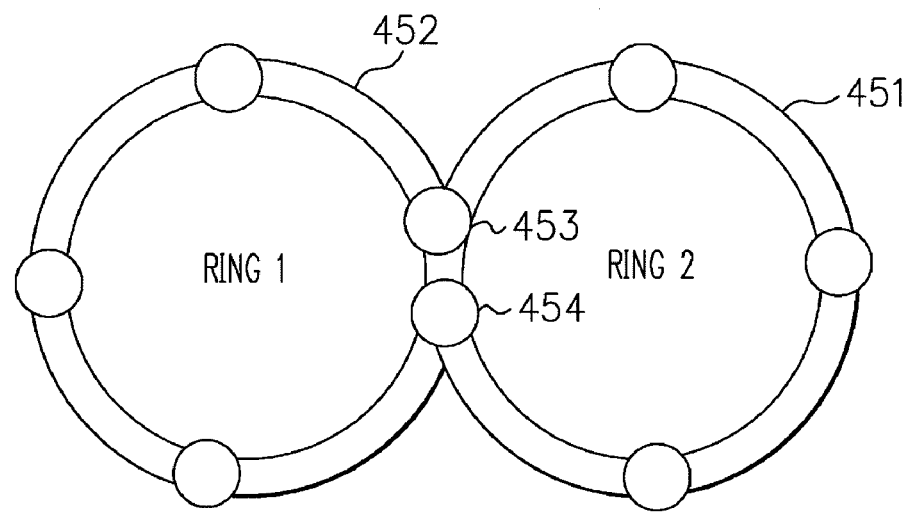
F I G. 6
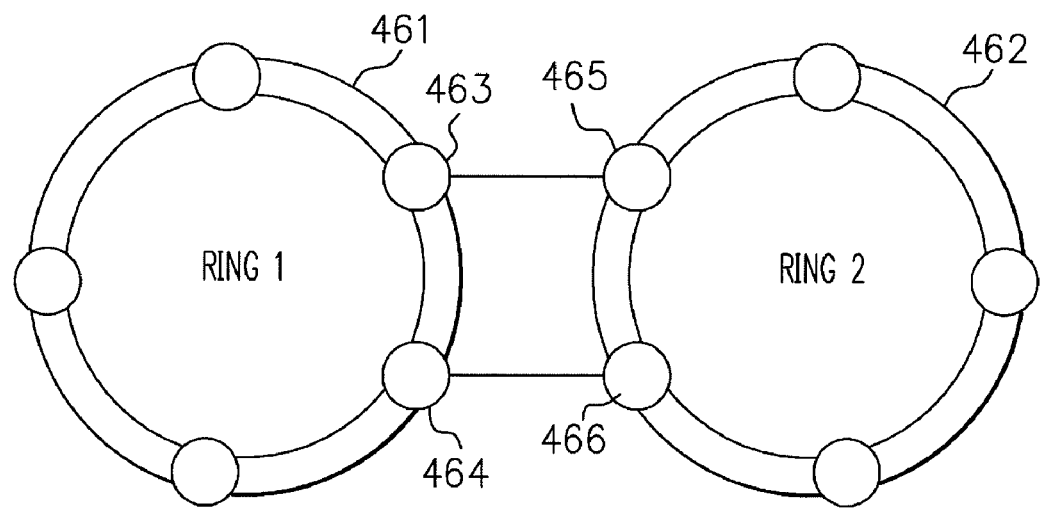

F I G. 11
(a)
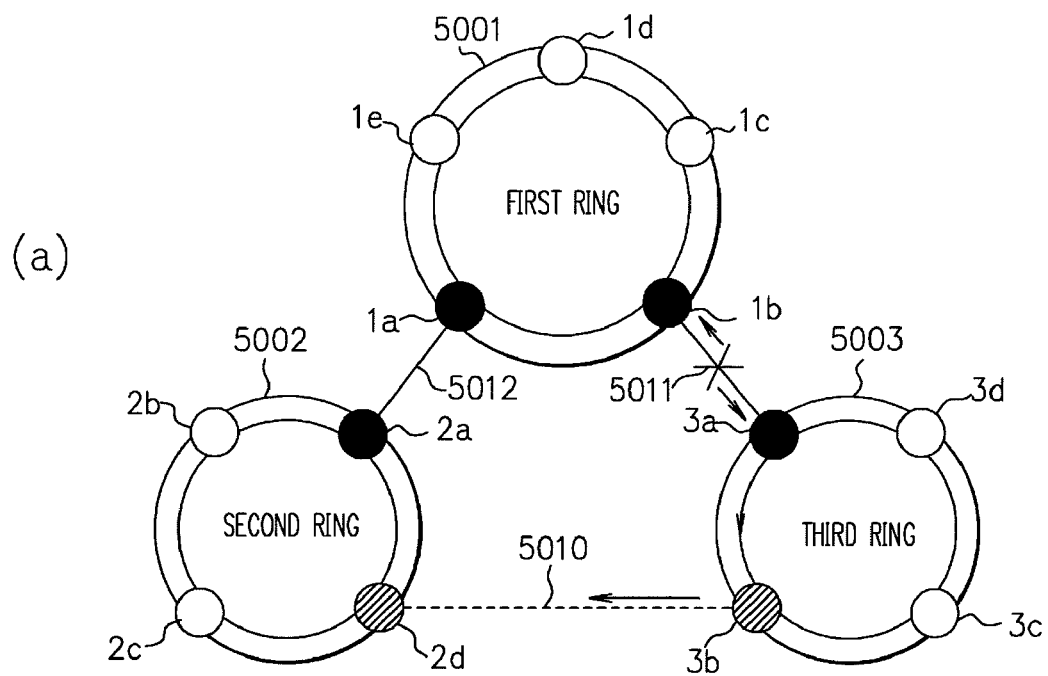
(b)
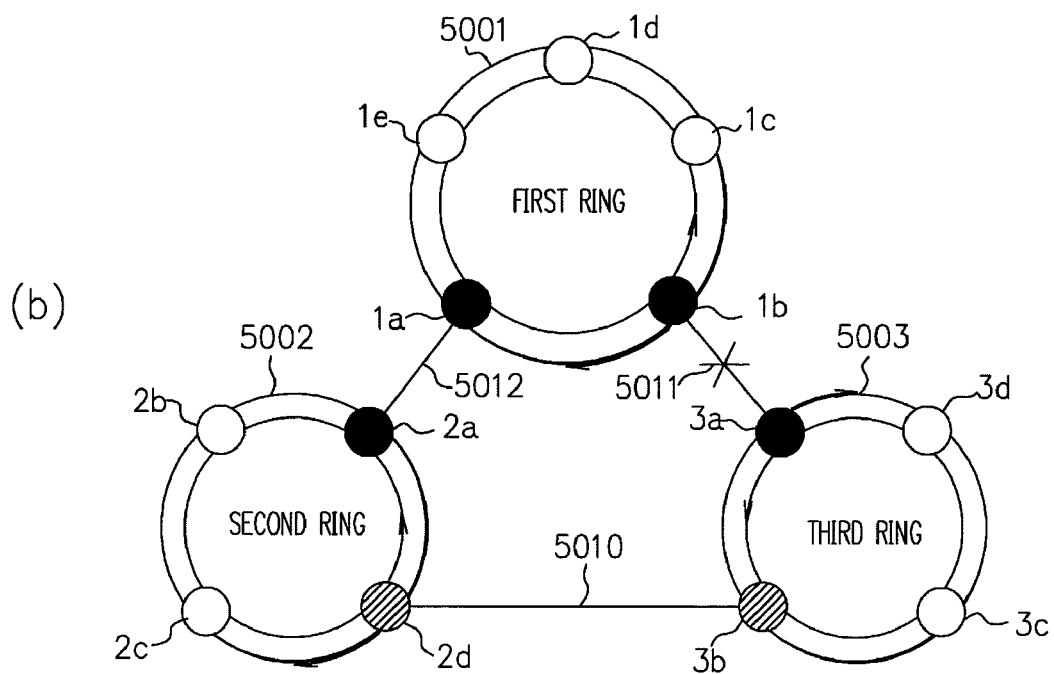

TO STEP S31 TO BE DESCRIBED LATER

F I G. 18
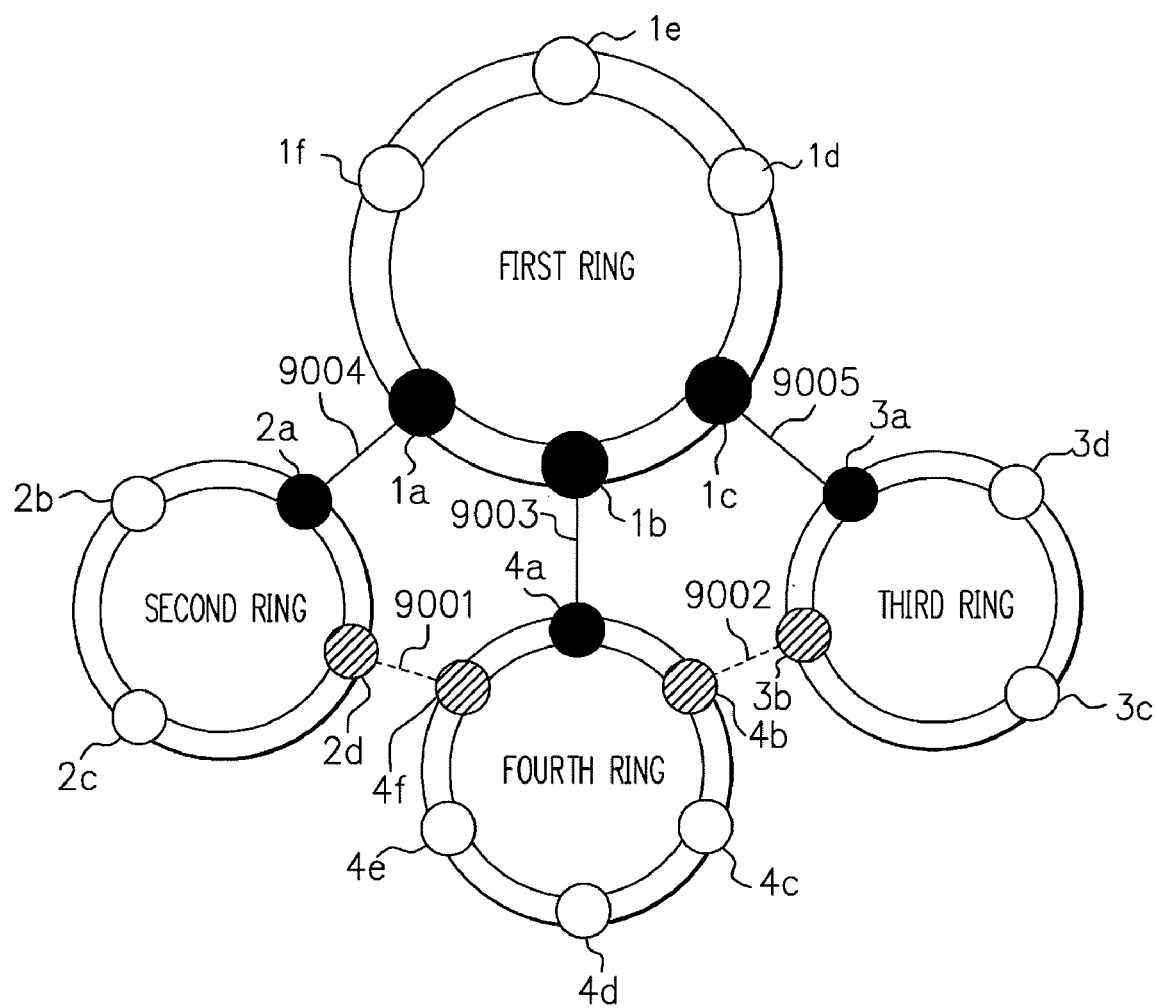

PACKET RING NETWORK SYSTEM AND PACKET TRANSPORT METHOD

This application is based upon and claims the benefit of priority from Japanese paten application No. 2007-163660, filed on Jun. 21, 2007, the disclosure of which is incorporated herein in its entirety by reference.

BACKGROUND OF THE INVENTION

The present invention relates to a packet ring network system, a packet transport method, an interlink node, a bypass pathway node, a program for an interlink node and a program for a bypass pathway node and, in particular, relates to a packet ring network system including three or more packet ring networks, a packet transport method applied to the packet ring network system, an interlink node, a bypass pathway node, a program for an interlink node and a program for a bypass pathway node.

DESCRIPTION OF RELATED ART

An RPR (Resilient Packet Ring) standardized under IEEE802.17 is nominated as a packet ring network. RPR is a MAC layer protocol supplying an access to a ring-form transmission medium and can provide rapid fault restoration of a carrier class, effective utilization of a network band, shortest pathway transport and the like.

From the point of view of a network operation management, it is effective to bring an RPR network into multi-ling connection for an operation for the purpose of expansion of service areas and limitation of a fault propagation range and the like. On the other hand, IEEE802.17 stipulates only a definition for a single ring and there is no definition on the multiring.

The RPR standardized under IEEE802.17 will be described as follows.

FIG. 1 is an explanatory diagram exemplifying a network configuration of an RPR. As illustrated in FIG. 1, a packet ring included in the RPR network has two ringlets 101 and 102 transporting packets in the mutually opposite direction. In addition, in a packet ring, a plurality of nodes (node apparatus) is brought into connection in a ring form. FIG. 1 illustrates the case where four nodes 103a, 103b, 103c and 103d are connected to a packet ring. Each node on a packet ring is provided with a RPR MAC address. Once a network is constructed, control packets are exchanged between nodes. Each node collects information such as hop number between respective nodes and the like to obtain topology information on a network.

Here, an RPR network is a packet ring network which includes nodes being brought into connection in a ring form and to which an RPR is applied.

In addition, not only nodes inside the same RPR network but also a terminal not belonging to an RPR network (herein to be referred to as a user terminal) is occasionally connected to each node (RPR node) on a packet ring. The example illustrated in FIG. 1 illustrates the case where a user terminal 104a is connected to a node 103a and a user terminal 104b is connected to a node 103b.

Among ports which a node on a packet ring network comprises, a port where transmission and reception of a packet is carried out with an apparatus not being present at the nodes inside the same packet ring network is called a tributary port. For example, among the port which the node 103a exemplified in FIG. 1 has, a port where transmission and reception of packets are carried out with the user terminal 104a is a tributary port.

Here, the RPR data packet is a data packet being transported inside a network RPR according to the RPR. In addition, in the case where a packet where a user terminal transmits (hereinafter to be referred to as client packet) is transported inside the RPR network, the client packet is stored in the RPR data packet as a payload of the RPR data packet and is transported as an RPR data packet. Storing a client packet in an RPR data packet as a payload thus is called encapsulation. In addition, extracting a client packet stored in an RPR data packet as a payload is called decapsulation.

RPR data packet standardized under IEEE802.17 will be described. FIG. 2 is an explanatory diagram illustrating an RPR format. In the case where the user terminal transmits a packet to a node, the user terminal transmits the client packet 211. The client packet 211 includes an MAC address (MAC DA) 212 of the user terminal at the destination of that client packet, an MAC address (MAC SA) 213 of the user terminal of the source of that client packet, transmission data 214 and an FCS (Frame Check Sequence) 215. In the case where the node receives a client packet from the user terminal, the node encapsulates that client packet to generate the RPR data packet 221 and to exchange transmission and reception of RPR data packet 221 among the nodes. The client packet 211 is encapsulated. The PRR data packet 221 is stored as data 226. In addition, the RPR packet 221 includes an MAC address (RPR MAC SA) 225 of the node of the destination, an MAC address (RPR MAC DA) 224 of the node of the source, a Base Control field 223, a TTL (Time To Live) field 222 and an FCS 227. The Base Control field 223 includes information designating a ringlet used for transporting and identification information for identifying the types of packets such as control packet and the like. The TTL field 222 is utilized for preventing a packet from revolving on a ring forever. Details of the RPR data packet format are described in "IEEE Std 802.17-2004 PART 17: Resilient packet ring (RPR) access method & physical layer specifications)", IEEE (Institute of Electrical and Electronics Engineers, Inc) p. 27-54 p. 211-223, p. 379-399.

Next, transmission, reception and a transport operation of the RPR data packet in each node on the ring will be described.

At first, the case of Unicast data packet (an RPR data packet to undergo unicast transmission) will be described. In the case where each node receives RPR data packet being transported on a ring and the RPR MAC DA of that RPR data packet corresponds with the RPR MAC address of the self-node, each node deletes that RPR data packet from the ring. In addition, in the case where the RPR MAC DA of the inbound RPR data packet is different from the RPR MAC address of the self-node, each node decrements the TTL and, thereafter retransmits that RPR data packet to the same ringlet as the inbound ringlet. In the case where the source node receives the Unicast data packet which itself has transmitted, the source node deletes that Unicast data packet from the ring. In addition, each node deletes that RPR data packet from the ring at the time point when the TTL has reached 0.

In addition, in the case of a broadcast data packet (RPR data packet to undergo broadcast transmission), each node decrements the TTL of the inbound broadcast data packet and thereafter transports the TTL to the subsequent node. In the case where the source node of the broadcast data packet receives the broadcast data packet which itself has transmitted, the source node deletes that broadcast data packet from the ring. In addition, each node deletes that RPR packet from the ring at the time point when the TTL has reached 0.

Next, an RPR control packet standardized under IEEE802.17 will be described. The RPR control packet is a packet for control to be transported inside the RPR network. Hereinafter, the RPR control packet will be described as a control packet. On all nodes belonging to the RPR network, in order to enable an autonomous operation such as a topology discovery function, a protection function and OAM (Operation, Administration and Maintenance) function, each RPR node transmits and receives the control packet via a data path. The RPR node transmits the control packet to two ringlets and receives the control packet transmitted by another RPR from each ringlet. For example, the RPR node 103a exemplified in FIG. 18 transmits the control packet generated by the RPR node 103a to the respective ringlets 101 and 102. In addition, the RPR node 103a receives the control packet transmitted by another RPR node from the respective ringlets 101 and 102. Under IEEE802.17, respective control packets are individually defined for respective functions. Transport of a control packet between RPR nodes is similar to already described transport of RPR data packet.

As the control packet for realizing the OAM (Operation, Administration and Maintenance) function, OAM control packet in Echo request/response, Flush and Organization specific is defined under IEEE802.17. Echo request/response packet is intended for confirmation on connection between stations, fault site specification and LRTT (Loop Round Trip Time) measurement between stations. A user can arbitrarily operate transmission of the request packet. The RPR node which receives a request packet transmits the response packet to the source node of the request packet. A Flush packet is a packet intended for RRTT (Ring Round Trip Time) measurement and prevention of a packet order error accompanied by transmission ring switching of a flow. A user can arbitrarily carry out a transmission operation of a Flash packet. The Flash packet goes around the ring once to reach the source node. The Flash packet revolves on the ring and causes each passing RPR node to dispose of all the RPR packets of the Transit buffer. An organization specific packet is an option allowing a user definition and there is no definition on functions in IEEE802.17.

Next, for an RPR network illustrated in FIG. 1, an operation of transmitting data from the user terminal 104a connected to the node 103a to the user terminal 104b connected to the node 103b will be described.

Each node learns MAC SA 213 of a source user terminal encapsulated in the inbound RPR data packet (see FIG. 2) and a source RPR MAC SA 225 (see FIG. 2) in a corresponded manner to retain a database of an RPR MAC address with a MAC address of a user terminal as a search key, that is, FDB. When the user terminal 104a transmits data (client packet) to a ring, the node 103a receives the client packet. The node 103a searches for an FDB (Forwarding Database) with a MAC DA 212 (see FIG. 2) in the inbound client packet as a search key and takes the result as RPR MAC DA 224 (MAC address of the destination node. See FIG. 2). In addition, the node 103a takes its own MAC address as RPR MAC SA 225 (MAC address of the source node. See FIG. 2) and encapsulates the inbound client packet from the user terminal 104a. Moreover, the node 103a searches for the topology database, selects a ringlet for supplying the shortest path from the source node to the destination node, sets the TTL value and transmits the RPR data packet to the ring.

In addition, in the case where the search for the FDB finds that the correspondence between the MAC address of a user terminal to become a destination and the RPR MAC address corresponding to the MAC address has not been learned yet, the node 103a carries out flooding. A broadcast address is set for the RPR MAC DA of the RPR data packet transmitted by flooding and the RPR data packet is received by all nodes on the ring. In the case where the RPR MAC address cannot be specified thus with the FDB, an RPR packet subjected to encapsulation on a client packet, to which a specific MAC address is allocated as MAC DA 212 to take the RPR MAC DA as the broadcast address, is described as an Unknown Unicast packet. In addition, as a result of flooding, the client packet transmitted by the user terminal 104a is received by a destination user terminal 104b. Normally, the user terminal 104b replies to the user terminal 104a in the upper layer. At the time of replay, the user terminal 104b becomes the source of the client packet. The user terminal 104a becomes the destination. In addition, the node 103b becomes the source of the RPR packet. When a reply from the user terminal 104b is implemented, the node 103a learns correspondence between the MAC address of the user terminal 104b and the RPR MAC address of the node 103b. Accordingly, in the case where the user terminal 104a transmits a client packet to the user terminal 104b again, the node 103a searches for the RPR MAC address of the node 103b with the MAC DA 212 included in the client packet as a key and becomes capable of carrying out Unicast transmission with the search result as the RPR MAC DA 224.

In addition, the method of flooding the broadcast packet in the ring includes a method that the source node implements transmission to arbitrary one ringlet and a method (bidirectional flooding) that a source node transmits a broadcast packet to the both ringlets and transports the packet to reach a point set on a ring in advance in order to prevent multiplexing transport. Here, a point of arrival of the packet being set on a ring in advance in order to prevent multiplexing transport is called the cleave point. In the case of bidirectional flooding, it is necessary to change the calculation method on TTL so that a packet is transported to all nodes depending on whether the node number inside a ring is even or odd and no duplex arrival occurs. However, this TTL calculation method does not relate to the present invention and, therefore, will not be described here.

Next, a TP packet will be described. The TP packet is a fixed-length packet and is a control packet for advertising information such as the state of span protection and an edge of a node and a sequence number to all packet ring nodes besides the self-node. The TTL value sets the node number for configuring a packet ring network to broadcast to two ringlets respectively. In addition, each node collects information of the inbound TP packet from all the nodes besides the self-node to construct a topology database.

The TP packet includes RPR MAC address of the source RPR node of that TP packet, TTL, TTL base (initial value of the TTL being set at the time of transmission), edge state information and protection information. Here, information detailed here is a part of information included in the TP packet. The TP packet includes information besides the above described information. The edge state information is information expressing whether or not the East span and the West span of the source RPR node of the TP packet is in an edge state (a state allowing no transmission of data).

Next, with reference to FIG. 3, protection action of the RPR at the time of the link fault will be described. Under IEEE802.17, a steering mode and a wrap mode are defined as protection action at the time of occurrence of a fault. The steering mode is defined as an indispensable function. The wrap mode is defined as a selection function. The steering mode and the wrap mode are introduced, for example, in Japanese Patent Laid Open Publication No. 2004-242194 (Paragraphs 0004 and 0012).

FIG. 3A illustrates network action at a normal time. FIG. 3A illustrates the state where packet transport is carried out on a ringlet 301 from a node 303a to a node 303b.

FIG. 3B illustrates action of the steering mode. In the case where fault point 304 occurs as illustrated in FIG. 3B, all nodes inside the ring obtain positional information on the fault point 304. That is, the nodes 303c and 303d being connected to a link having become the fault point 304 notifies all the other nodes of positional information on the fault point 304. Consequently, each node recognizes the position of the fault point 304. And, in the case of transmitting a Unicast packet, the source node selects a ringlet including no fault point 304 in midway to the destination node of the RPR packet to transmit a Unicast packet. For example, in the case where the node 303a transmits a Unicast packet to the node 303b, the position of the fault point 304 is recognized and thereby, the ringlet transmitting the Unicast packet is changed from the ringlet 301 to the ringlet 302 to transport the packet to the node 303b. In addition, in the case of transmitting the broadcast packet, both ringlets 301 and 302 are selected to transmit the broadcast packet to the respective ringlets 301 and 302. Consequently, the broadcast packet is transmitted to each node in the ring.

FIG. 3C illustrates action in the wrap mode. In the wrap mode, the source node selects the same ringlet as the ringlet at the normal time to transmit the RPR packet. For example, in the case where the node 303a transmits the RPR packet to the node 303b, the node 303a selects the ringlet 301 likewise at the normal time (see FIG. 3A) to transmit the RPR packet. In the case where the node 303c, which is connected to a link having become the fault point 304 and has detected the fault, receives the RPR packet, the node 303c selects a ringlet 302 different from the ringlet 301, where that packet is transmitted and arrives, and transports the RPR packet with the ringlet 302. That is, the node 303c transports the RPR packet to the side where no fault point 304 is present. This packet is transported on the ringlet 302 and is transported to reach the node 303d, which is connected to the link having become the fault point 304 and has detected the fault. The node 303d also selects the ringlet different from the ringlet, where that packet is transmitted and arrives, and transports the RPR packet with that ringlet. Consequently the destination node 303b receives the RPR packet.

In FIG. 3, the case where a fault has occurred in a link is described as an example. As illustrated in FIG. 4, the protection action in the case where a fault occurs in a node is also similar to the action in the case where a fault occurs in a link. Here, FIG. 4 illustrates, as an example, the case where a node 303e is present between the nodes 303c and 303d and that node 303e has become a fault point 304.

A system with a plurality of RPR networks brought into connection is described, for example, in Japanese Patent Laid Open Publication No. 2003-258822 (Paragraph 0022, FIG. 1), International Publication 2006/092915 (Paragraph 0101, FIG. 1) and Japanese Patent Laid Open Publication No. 2006-129071 (Paragraph 0159, FIG. 11). FIG. 5 is an explanatory diagram exemplifying a packet ring network system described in Japanese Patent Laid Open Publication No. 2003-258822 (Paragraph 0022, FIG. 1). As illustrated in FIG. 5, the packet ring network described in Japanese Patent Laid Open Publication No. 2003-258822 (Paragraph 0022, FIG. 1) comprises two adjacent nodes 453 and 454 bringing the two packet rings 451 and 452 into connection and makes the inter-ring connection redundant. In addition, FIG. 6 is an explanatory diagram exemplifying a packet ring network system described in International Publication 2006/092915 (Paragraph 0101, FIG. 1). For the system described in International Publication 2006/092915 (Paragraph 0101, FIG. 1), the respective packet rings 461 and 462 are provided with a plurality of inter-ring connection nodes 463, 464, 465 and 466 so that the inter-ring connection nodes 463 and 465 themselves and the inter-ring connection nodes 464 and 466 themselves of the respective packet ring are brought into connection through a link to make the inter-ring connection redundant. For the systems described in Japanese Patent Laid Open Publication No. 2003-258822 (Paragraph 0022, FIG. 1) and International Publication 2006/092915 (Paragraph 0101, FIG. 1), connection between the two packet rings are made redundant.

A fault recovery system on interlink fault or inter-ring connection node fault in the RPR multi-ring connection described in Japanese Patent Laid Open Publication No. 2003-258822 (Paragraph 0022, FIG. 1) and International Publication 2006/092915 (Paragraph 0101, FIG. 1) secures connectivity directly with the same ring network also in an occurrence of a fault as the ring network prior to the occurrence of a fault. For example, as illustrated in FIG. 6, connection between the first RPR ring 1 and the second RPR ring 2 is made redundant. Even if a fault occurs in any one interlink or any inter-ring connection node, the other interlink or inter-ring connection node secures inter-ring connectivity. At that time, connection between two RPR rings can be directly established also after the fault recovery likewise prior to the fault recovery.

In addition, the Japanese Patent Laid Open Publication No. 2006-129071 (Paragraph 0159, FIG. 11) describes that a plurality of ring networks are brought into connection to a single ring network with a plurality of redundant node apparatuses for the ring networks respectively.

In addition, Japanese Patent Laid Open Publication No. 10-4424 describes a line recovery system securing a detour in a ring form network including a ring form network brought into ring form connection further. In a system described in Japanese Patent Laid Open Publication No. 10-4424, ring form networks themselves are brought into connection with a plurality of inter-ring connection transmission paths.

In addition, "IEEE Std 802.17-2004 PART 17: Resilient packet ring (RPR) access method & physical layer specifications)", IEEE (Institute of Electrical and Electronics Engineers, Inc) p. 27-54 p. 211-223, p. 379-399 also describes node structure and an OAM function.

Even if the connection between packet ring networks themselves are made redundant as in the configuration illustrated in FIG. 6, a node bringing the packet ring networks themselves into connection is mostly installed in the same base point or in the adjacent base points. Therefore, in the case where a fault occurs across a wide range due to a disaster and the like, fault recovery cannot be realized by employment of redundancy, giving rise to the state where no reliability is secured even if the connection between the packet ring networks themselves is made redundant. In addition, in the case where the respective nodes bringing the packet ring networks themselves in connection are installed apart, it is difficult to secure transmission path such as optical fiber and the like bringing the nodes themselves into connection, giving rise to a problem.

In the case where the packet ring networks themselves are brought into ring form connection and a fault occurs in connection between certain packet ring networks (taken as A and B), securement of communication between A and B with another packet ring network as a detour can be considered.

However, only making ring form connection between the packet ring networks themselves forms, when a fault does not occur, a loop in the packet transport path to generate broadcast storm and packet redundant arrivals and the like, giving rise to a problem.

SUMMARY OF THE INVENTION

The present invention is attained in view of the above described circumstances and an exemplary object is to provide a packet ring network system, a packet transport method and the like capable of reestablishing a communication path between two packet ring networks through another packet ring network even if a fault occurs between the two packet ring networks and preventing occurrence of broadcast storm and redundant arrivals of a packet.

In order to attain such an object, the present invention will be provided with the following features.

<Packet Ring Network System>

A first packet ring network system related to the present invention is a packet ring network system including a plurality of packet ring networks to which nodes are brought into ring form connection so that a packet inside a ring obtained by encapsulating a client packet, which a terminal outside the packet ring network transmits, is transmitted and received in a packet ring network, wherein a first packet ring network is included;

a plurality of subpacket ring networks being packet ring networks connected to the first packet ring network through an interlink being a packet transport pathway used for a client packet transport between the packet ring networks is included;

the interlink is provided to each of the subpacket ring networks connected to the first packet ring network;

the first packet rings and each of the subpacket ring networks include an interlink node being a node connected to an interlink;

each of the subpacket ring networks is connected to another subpacket ring network through a bypass pathway being a packet transport pathway used for client packet transport when a fault occurs in an interlink;

each of the subpacket ring networks includes a bypass pathway node being a node connected to a bypass pathway to another subpacket ring network, and the bypass pathway node starts transport of a client packet with a bypass pathway in the case where a fault occurs in an interlink between a subpacket ring network to which a self-node belongs and a first packet ring network or in an interlink between a subpacket ring network to which a bypass pathway node connected to the self-node through a bypass pathway belongs and the first packet ring network.

<Packet Transport Method>

A first packet transport method related to the present invention is a packet transport method applied to a packet ring network system, including a plurality of packet ring networks to which nodes are brought into ring form connection, transmitting/receiving in a packet ring network a packet inside a ring obtained by encapsulating a client packet which a terminal outside the packet ring network transmits and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, wherein the bypass pathway node starts transport of a client packet with a bypass pathway in the case where a fault occurs in an interlink between a subpacket ring network to which a self-node belongs and a first packet ring network or in an interlink between a subpacket ring network to which a bypass pathway node connected to the self-node through a bypass pathway belongs and the first packet ring network.

<Interlink Node>

A first interlink node related to the present invention is an interlink node applied to a packet ring network system, including a plurality of packet ring networks to which nodes are brought into ring form connection, transmitting/receiving in a packet ring network a packet inside a ring obtained by encapsulating a client packet which a terminal outside the packet ring network transmits and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, wherein the interlink includes:

an address table storage part inside an interlink node storing an address table specifying corresponding relation between an address of a terminal outside a packet ring network and an address of a node inside the packet ring network;

a fault detecting part detecting a fault occurrence in an interlink;

a bypass pathway node address registration part registering an address of the bypass pathway node in the case where a bypass pathway node belongs to the same packet ring network to which the relevant interlink node belongs;

an interlink fault notifying packet transmitting part transmitting an interlink fault notifying packet notifying a fault occurrence in an interlink to an address registered in the bypass pathway node address registration part as a destination address;

an invalidation requesting part inside an interlink node transmitting an address table invalidation requesting packet instructing invalidation of an address table to each node belonging to the same packet ring network as the relevant interlink node belongs to when the fault detecting part detects a fault occurrence in an interlink;

an invalidation part inside an interlink node invalidating an address table of a self-node when the fault detecting part detects a fault occurrence in an interlink or in the case of receipt of an address table invalidation requesting packet from another node; and an address learning part inside an interlink node causing the address table storage part inside an interlink node to store an address of a source terminal of the client packet and an address of a source node of a packet inside the ring in a corresponded manner as an address table at the time of receiving a packet inside a ring obtained by encapsulating a client packet.

<Bypass Pathway Node>

A first bypass pathway node related to the present invention is a bypass pathway node applied to a packet ring network system, including a plurality of packet ring networks to which nodes are brought into ring form connection, transmitting/receiving in a packet ring network a packet inside a ring obtained by encapsulating a client packet which a terminal outside the packet ring network transmits and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, wherein the bypass pathway node includes:

an address table storage part inside a bypass pathway node storing an address table specifying corresponding relation between an address of a terminal outside a packet ring network and an address of a node inside the packet ring network;

a fault occurrence notifying part notifying a bypass pathway node inside another subpacket ring network connected to the relevant bypass pathway node through a bypass pathway of a fault occurrence in an interlink in the case of receipt of an interlink fault notifying packet from an interlink node inside the same subpacket ring network as the network in which the relevant bypass pathway node is present;

a client packet transmission/reception control part starting transmission/reception of a client packet through a bypass pathway in the case of receipt of an interlink fault notifying packet from an interlink node inside the same subpacket ring network as the network in which the relevant bypass pathway id present or in the case of receipt of a notice of a fault occurrence in an interlink from a bypass pathway node inside another subpacket ring network connected to the relevant bypass pathway node through a bypass pathway;

an invalidation requesting part inside a bypass pathway node transmitting an address table invalidation requesting packet instructing invalidation of the address table to each node belonging to the same packet ring network as the relevant bypass pathway node does in the case of receipt of a notice of a fault occurrence in an interlink from a bypass pathway node inside another subpacket ring network connected to the relevant bypass pathway node through a bypass pathway;

an invalidation part inside a bypass pathway node invalidating an address table of a self-node in the case of receipt of a notice of a fault occurrence in an interlink from a bypass pathway node inside another subpacket ring network connected to the relevant bypass pathway node through a bypass pathway or in the case of receipt of an address table invalidation requesting packet from another node; and an address learning part inside a bypass pathway node causing the address table storage part inside the bypass pathway node to store an address of a source terminal of the client packet and an address of a source node of a packet inside the ring in a corresponded manner as an address table at the time of receiving a packet inside a ring obtained by encapsulating a client packet.

<Program>

A first program (i.e., a non-transitory computer readable medium) related to the present invention is a program for an interlink node causing a computer provided in an interlink node applied to an packet ring network system, including a plurality of packet ring networks to which nodes are brought into ring form connection, transmitting/receiving a packet inside a ring obtained by encapsulating a client packet which a terminal outside the packet ring network in a packet ring network and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, to execute a learning process storing an address of a source terminal of the client packet and an address of a source node of a packet inside the ring in a corresponded manner as an address table at the time of receiving a packet inside a ring obtained by encapsulating a client packet;

a fault detecting process detecting a fault occurrence in an interlink;

an interlink fault notifying packet transmitting processing transmitting an interlink fault notifying packet notifying a fault occurrence in an interlink to an address stored in advance in the bypass pathway node as a destination address;

an invalidation requesting processing transmitting an address table invalidation requesting packet instructing invalidation of an address table to each node belonging to the same packet ring network as the relevant interlink node belongs to when a fault occurrence is detected in an interlink; and an invalidation processing invalidating an address table of a self-node when a fault occurrence is detected in an interlink or in the case of receipt of an address table invalidation requesting packet from another node.

In addition, a second program related to the present invention is a program for a bypass pathway node causing a computer provided in a bypass pathway node applied to a packet ring network system, including a plurality of packet ring networks to which nodes are brought into ring form connection, transmitting/ receiving in a packet ring network a packet inside a ring obtained by encapsulating a client packet which a terminal outside the packet ring network transmits and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, to execute a learning process storing an address of a source terminal of the client packet and an address of a source node of a packet inside the ring in a corresponded manner as an address table at the time of receiving a packet inside a ring obtained by encapsulating a client packet;

a fault occurrence notifying processing notifying a bypass pathway node inside another subpacket ring network connected to the relevant bypass pathway node through a bypass pathway of a fault occurrence in an interlink in the case of receipt of an interlink fault notifying packet from an interlink node inside the same subpacket ring network as the network in which the relevant bypass pathway node is present;

a client packet transmission/reception control processing starting transmission/reception of a client packet through a bypass pathway in the case of receipt of an interlink fault notifying packet from an interlink node inside the same subpacket ring network as the network in which the relevant bypass pathway is present or in the case of receipt of a notice of a fault occurrence in an interlink from a bypass pathway node inside another subpacket ring network connected to the relevant bypass pathway node through a bypass pathway;

an invalidation requesting processing transmitting an address table invalidation requesting packet instructing invalidation of the address table to each node belonging to the same packet ring network as the relevant bypass pathway node does in the case of receipt of a notice of a fault occurrence in an interlink from a bypass pathway node inside another subpacket ring network connected to the relevant bypass pathway node through a bypass pathway; and an invalidation processing invalidating an address table of a self-node in the case of receipt of a notice of a fault occurrence in an interlink from a bypass pathway node inside another subpacket ring network connected to the relevant bypass pathway node through a bypass pathway or in the case of receipt of an address table invalidation requesting packet from another node.

BRIEF DESCRIPTION OF THE DRAWINGS

The objects and features of the present invention will become more apparent from the consideration of the following detailed description taken in conjunction with the accompanying drawings, in which:

FIG. 1 is a diagram exemplifying an RPR network configuration;

FIG. 5 is an explanatory diagram illustrating an example of a packet ring network system described in Japanese Patent Laid Open Publication No. 2003-258822 (Paragraph 0022, FIG. 1);

FIG. 6 is an explanatory diagram illustrating a packet ring network system described in International Publication 2006/092915 (Paragraph 0101, FIG. 1);

FIG. 11 is an explanatory diagram illustrating the state where a fault occurs in an interlink in an exemplary embodiment of the present invention;

FIG. 18 is a diagram exemplifying a packet ring network system bringing three subrings into connection to a first ring in an exemplary embodiment of the present invention;

EXEMPLARY EMBODIMENT

Exemplary embodiments of the present invention will be described below with reference to the drawings.

First Exemplary Embodiment

Figure 7:
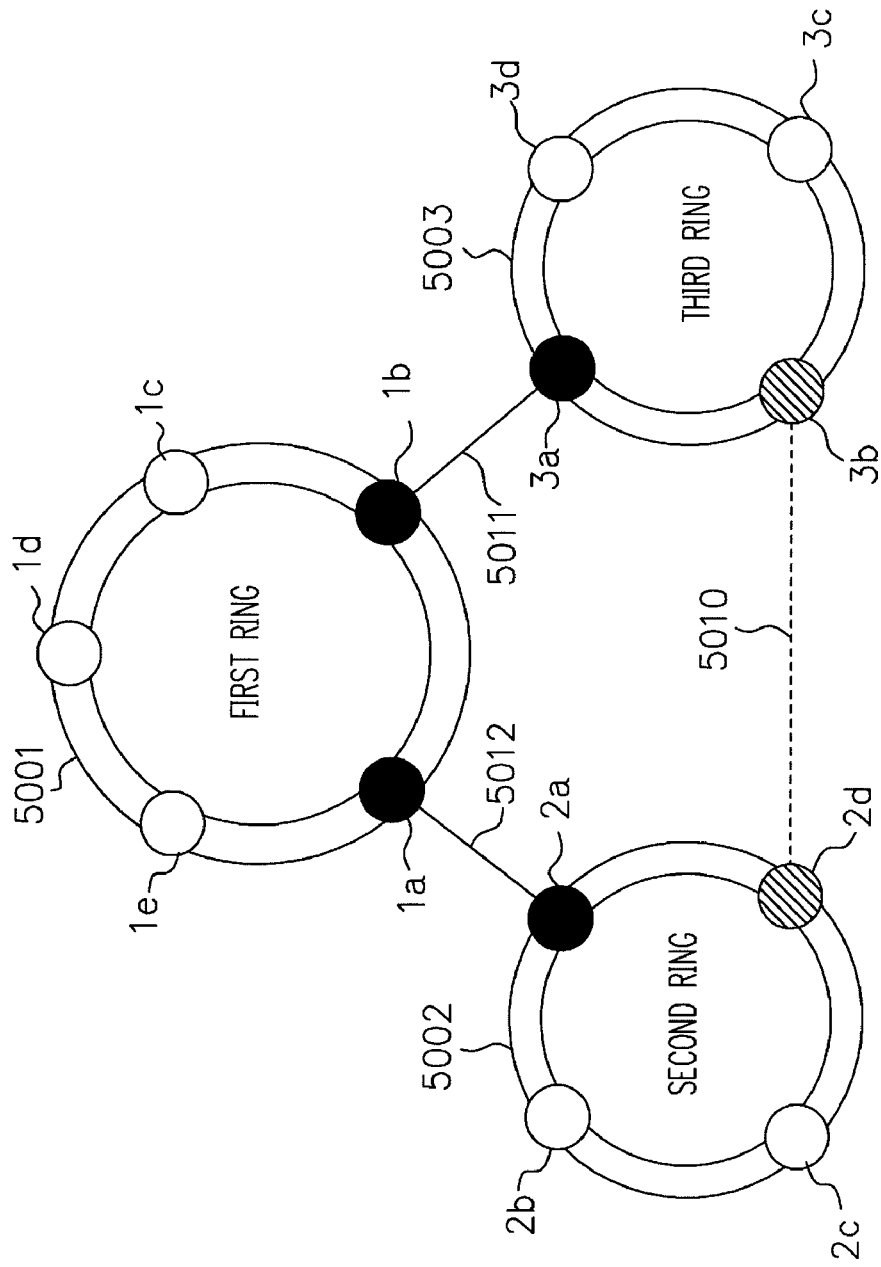
FIG. 7 is an explanatory diagram exemplifying a packet ring network system related to an exemplary embodiment of the present invention.

FIG. 7 is an explanatory diagram exemplifying a packet ring network system according to a first exemplary embodiment of the present invention. A packet ring network system exemplified in FIG. 7 has a configuration bringing first to third respective packet ring networks 5001, 5002 and 5003 into connection through a link. The first to third respective packet ring networks 5001, 5002 and 5003 are respectively RPR networks. In any of the first to third respective packet ring networks 5001, 5002 and 5003, a plurality of RPR nodes is brought into ring form connection.

The first to third respective packet ring networks will be hereafter referred to as a first ring, second ring and third ring respectively. Here, the second ring and the third ring connected to the first ring through an interlink correspond to a subpacket ring network. The subpacket ring networks themselves are brought into connection with a bypass pathway.

In addition, an interlink is a packet transport pathway used for client packet transport between packet ring networks. An interlink is provided to each subpacket ring network being connected to the first ring. The bypass pathway is a packet transport pathway used for client packet transport when a fault occurs in an interlink. More specifically, a bypass pathway is used for transport of a client packet when a fault occurs in an interlink between any one of two subpacket ring networks brought into connection with that bypass pathway and the first ring.

In addition, an interlink node is a node brought into connection through an interlink. A bypass pathway node is a node brought into connection through a bypass pathway. In FIG. 7, (likewise in the other drawing to be described below), an interlink node is specified in black color, the bypass pathway node is specified by a shaded portion and other nodes (hereinafter, denoted as basic nodes) are specified in white color. In the first exemplary embodiment, the number of the bypass pathway nodes arranged in one ring (RPR network) is 1 at a maximum.

In the first ring 5001, interlink nodes 1a and 1b and basic nodes 1c to 1e are brought into ring form connection. In the second ring 5002, an interlink node 2a, a bypass pathway node 2d and basic nodes 2b and 2c are brought into ring form connection. Similarly, in the third ring 5003, an interlink node 3a, a bypass pathway node 3b and basic nodes 3c and 3d are brought into ring form connection.

In the interlink node 1a of the first ring and the interlink node 2a of the second ring, tributary ports thereof are mutually brought into connection through the interlink 5012. Similarly, in the interlink node 1b of the first ring and the interlink node 3a of the third ring, tributary ports thereof are mutually brought into connection through the interlink 5011. In addition, in the bypass pathway node 2d of the second ring and the bypass pathway node 3b of the third ring, tributary ports thereof are mutually brought into connection through the bypass pathway 5010.

When the interlink is normal, the bypass pathway nodes 2d and 3b might receive a packet through the bypass pathway 5010 but, nevertheless, disposes that packet and does not implement packet transmission from the self-node to the bypass pathway 5010, either. This state is a closed state. However, even in the closed state, transmission and reception of the keep-alive packet are implemented. In addition, the bypass pathway nodes 2d and 3b receive a packet through the bypass pathway 5010 in the case where a fault occurs in any interlink, and, then, encapsulates and transports that packet to inside the packet ring network, to which itself belongs, and carries out packet transmission from the self-node to the bypass pathway 5010. This state is an open state.

All nodes (RPR nodes) 1a to 1e, 2a to 2d and 3a to 3d illustrated in FIG. 7 comprises IEEE802.17-compliant RPR functions. In addition to the respective standard RPR functions, the interlink node and the bypass pathway node comprise components for operating as an interlink node and a bypass pathway node. A configuration of the interlink node, the bypass pathway node and the basic node will be described below.

Figure 8:
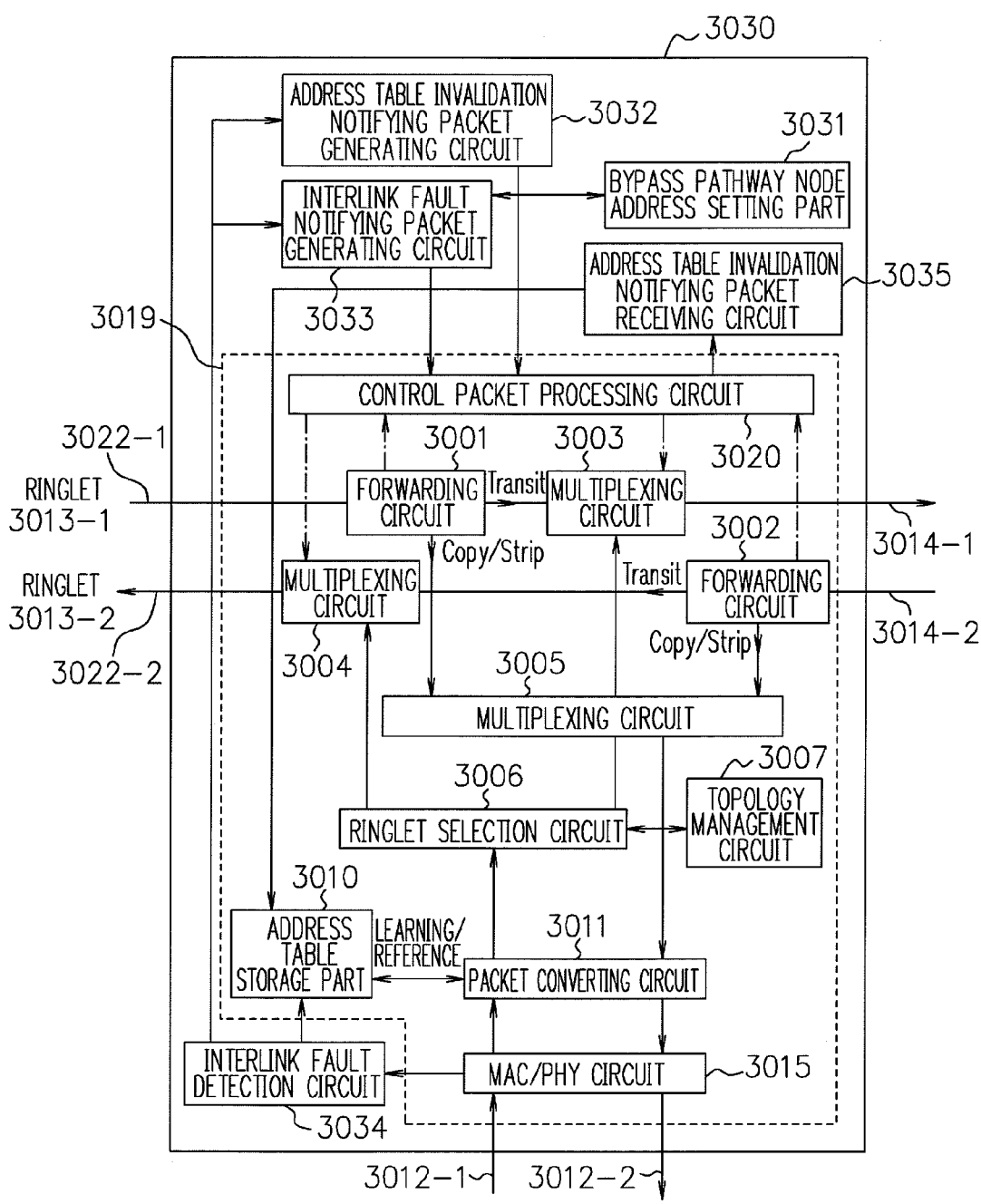
FIG. 8 is a block diagram exemplifying an interlink node configuration in an exemplary embodiment of the present invention.

FIG. 8 is a block diagram exemplifying an interlink node configuration of the present invention. An interlink node 3030 illustrated in FIG. 8 is arranged as interlink nodes 1a, 1b, 2a and 3a illustrated in FIG. 7.

The interlink node 3030 comprises an RPR basic node part 3019, a bypass pathway node address setting part 3031, an address table invalidation notifying packet generating circuit 3032, an interlink fault notifying packet generating circuit 3033, an interlink fault detection circuit 3034 and an address table invalidation notifying packet receiving circuit 3035 operating according to IEEE802.17 standard protocol.

The RPR basic node part 3019 is provided not only to the interlink node but also to each bypass pathway node and each basic node respectively being arranged in the RPR network.

At first, the RPR basic node part 3019 will be described. The RPR basic node part 3019 comprises a forwarding circuit 3001 as well as a multiplexing circuit 3003 corresponding to a ringlet 3013-1, a forwarding circuit 3002 as well as a multiplexing circuit 3004 corresponding to a ringlet 3013-2, a control packet processing circuit 3020, a topology management circuit 3007, a multiplexing circuit 3005, a ringlet selection circuit 3006, a packet converting circuit 3011, an address table storage part 3010 and an MAC/PHY circuit 3015.

The forwarding circuit 3001 refers to an RPR MAC DA of an inbound RPR packet transported from the ringlet 3013-1. If that RPR MAC DA corresponds with RPR MAC address of the self-node, that RPR packet is stripped from the ringlet 3013-1 and transmitted to the multiplexing circuit 3005 in order to be transported to a client. Similarly, the forwarding circuit 3002 refers to an RPR MAC DA of an inbound RPR packet transported from the ringlet 3013-2 and if that RPR MAC DA corresponds with RPR MAC address of the self-node, that RPR packet is stripped from the ringlet 3013-2 and transmitted to the multiplexing circuit 3005. Here, stripping (deleting) an inbound packet transported from a ringlet from inside a ring to transport to a client will be described as "Strip". In addition, a client is an apparatus brought into connection through a tributary port. The client of a interlink node is an interlink node arranged in another RPR network.

In addition, in the case where the inbound transported RPR packet is a broadcast packet, the forwarding circuits 3001 and 3002 transmits the broadcast packet to the multiplexing circuit 3005 and also transports broadcast packet to the ringlet. Here, transporting an inbound packet transported from a ringlet to that ringlet will be described as "Transit". In addition, transporting an inbound packet transported from a ringlet to that ringlet and also transporting that packet to a client will be described as "Copy". The forwarding circuits 3001 and 3002 transmit (Transit) the inbound transported packet to the same ringlet in the case where the inbound transported RPR packet is not applicable to any of the above described cases.

In addition, in the case of receiving a control packet, the forwarding circuits 3001 and 3002 output the control packet to the control packet processing circuit 3020. In the case of receiving a TP packet, the forwarding circuits 3001 and 3002 subtract 1 from the TTL in that TP packet to output the result to the control packet processing circuit 3020 and the corresponding multiplexing circuit (any of the multiplexing circuits 3003 and 3004). That is, the TP packet is output to the control packet processing circuit 3020 of the self-node and the TP packet is transported to the next node.

The port 3022-1 is a port where the forwarding circuit 3001 receives a packet from the ringlet 3013-1. The port 3014-2 is a port where the forwarding circuit 3002 receives a packet from the ringlet 3013-2.

The port 3014-1 is a port where the multiplexing circuit 3003 transmits a packet to the ringlet 3013-1.

The port 3022-2 is a port where the multiplexing circuit 3004 transmits a packet to the ringlet 3013-2.

In addition, the client ports 3012-1 and 3012-2 of the interlink node are connected to a client port of the opposite interlink node.

Here, "opposite" means a node of the side of a counter party brought into connection through an interlink or a bypass pathway. For example, the interlink nodes 1a and 2a exemplified in FIG. 7 are mutually opposite nodes. Similarly, the bypass pathway nodes 2d and 3b exemplified in FIG. 7 are also mutually opposite nodes.

The MAC/PHY circuit 3015 receives a client packet from the port 3012-1 and transmits that client packet to the packet converting circuit 3011. In addition, the MAC/PHY circuit 3015 transmits the client packet transmitted from the packet converting circuit 3011 from the port 3012-2.

Each link in the packet ring network system is in the state where light is always allowed to pass at the normal time regardless of the occurrence of packet transport. Accordingly, unless a fault occurs in a link or an apparatus brought into connection through a link, light is input from the port 3012-1 to the MAC/PHY circuit 3015. In addition, if a fault occurs in a link and the like, light being input from the port 3012-1 to the MAC/PHY circuit 3015 will be interrupted.

The multiplexing circuit 3005 multiplexes packets being transported from each ringlet (respective forwarding circuits 3001 and 3002) to a client and transmits the packets to the packet converting circuit 3011.

The address table storage part 3010 is a storage apparatus storing an address table. The address table is information relating an MAC address of a user terminal (not illustrated in FIG. 1) to an RPR MAC address of a node inside a ring. The address table is used as an FDB.

The packet converting circuit 3011 receives a packet transported from the respective ringlets (respective forwarding circuits 3001 and 3002) to a client through the multiplexing circuit 3005. The packet converting circuit 3011 receives a packet in the state of an RPR packet to strip a client packet from that RPR packet (that is, decapsulation is carried out). The packet converting circuit 3011 transports that client packet from the port 3012-2 to a client. In addition, the packet converting circuit 3011 learns corresponded relation between the RPR MAC SA in the received RPR packet and the MAC SA in the stripped client packet and records the corresponded relation in the address table storage part 3010. A set of the above described having been recorded thus is an address table. Here, the MAC SA in the stripped client packet is the MAC address of a user terminal having transmitted the client packet.

In addition, the packet converting circuit 3011 receives a client packet from a client through the client port 3012-1. At that time, the packet converting circuit 3011 refers to the address table stored in the address table storage part 3010 to search for the RPR MAC address corresponding to the MAC DA in the inbound client packet. If there is an entry (that is, search is successful), the packet converting circuit 3011 encapsulates the client packet with the searched RPR MAC address as the RPR MAC DA.

In addition, if there is no entry (that is, searching turns out to be a failure), the broadcast address is taken as the RPR MAC DA to encapsulate the client packet (in this case, an Unknown Unicast packet will be prepared). The packet converting circuit 3011 outputs a packet with the RPR MAC DA set and encapsulated therein, to the ringlet selection circuit 3006.

The ringlet selection circuit 3006 refers to the topology management circuit 3007 to select a ringlet reachable to a destination node on the shortest pathway, set the TTL and outputs the packet in the case where the inbound packet transmitted from the packet converting circuit 3011 is a Unicast packet. In addition, the ringlet selection circuit 3006 selects a ringlet according to predetermined transport method (unidirectional flooding or bidirectional flooding), sets the TTL and outputs the packet in the case where the inbound packet transmitted from the packet converting circuit 3011 is a broadcast packet (including an Unknown Unicast packet).

The topology management circuit 3007 stores and manages RPR MAC addresses of respective nodes aligned clockwise in a ring including the self-node and RPR MAC addresses of respective nodes aligned counterclockwise. In addition, edge form information and protection information of that node are also stored together with the RPR MAC addresses of respective nodes. Information such as RPR MAC addresses of respective nodes aligned clockwise in a ring including the self-node and RPR MAC addresses of respective nodes aligned counterclockwise is called topology database.

The control packet processing circuit 3020 generates respective types of control packets such as a TP packet to output those packets to a multiplexing circuit corresponding to a ringlet which transmits those packets. That is, the control packet to be transmitted to the ringlet 3013-1 is output to the multiplexing circuit 3003. The control packet to be transmitted to the ringlet 3013-2 is output to the multiplexing circuit 3004. The control packet processing circuit 3020 generates and outputs a TP packet including the TTL, the TTL base, the edge form information and the protection information to the multiplexing circuits 3003 and 3004.

In addition, in the case of receiving a control packet from the forwarding circuits 3001 and 3002, the control packet processing circuit 3020 carries out processing corresponding to that control packet. The control packet processing circuit 3020 prepares a topology database which the topology management circuit 3007 is caused to store when the TP packet transmitted by each node inside the ring, to which the self-node belongs, is input. The inbound TP packet includes the TTL and the TTL base (the initial value of the TTL). Accordingly, the hop count (a value specifying in which hop counted from the self-node the source node of the TP packet is present) can be obtained based on the TTL and the TTL base. That is, for each inbound TP packet from one ringlet, the control packet processing circuit 3020 derives as a hop count a value obtained by subtracting a TTL from the TTL base and causes the topology management circuit 3007 to store the RPR MAC address and the like of the source of the TP packet in the order of the hop count. Similarly, also as for the inbound TP packet from the other ringlet, the control packet processing circuit 3020 derives for each TP packet as a hop count a value obtained by subtracting a TTL from the TTL base and causes the topology management circuit 3007 to store the RPR MAC address and the like of the source of the TP packet in the order of the hop count. Information thus stored in the topology management circuit 3007 will become the topology database.

The multiplexing circuit 3003 multiplexes the packet from the port 3012-1, the packet (the packet which the forwarding circuit 3001 outputs) from the ring and the packet from the control packet processing circuit 3020 and transmits the result to the ringlet 3013-1. Similarly, the multiplexing circuit 3004 multiplexes the packet from the port 3012-1, the packet (the packet which the forwarding circuit 3002 outputs) from the ring and the packet from the control packet processing circuit 3020 and transmits the result to the ringlet 3013-2.

Next, components other than the RPR basic node part 3019 will be described. The bypass pathway node address setting part 3031 is a circuit where its RPR address (RPR MAC address of the bypass pathway node) is registered in the case where the bypass pathway node is present in the RPR network to which the interlink node belongs. Registration of the RPR address of the bypass pathway node for the bypass pathway node address setting part 3031 is carried out by a manager and the like in advance. If an address is registered in the bypass pathway address setting part 3031, it is possible to recognize presence of a bypass pathway node in the RPR network to which the interlink node belongs and its RPR address concurrently. In an example illustrated in FIG. 7, no bypass pathway node is present in the first ring. Accordingly, no RPR address of the bypass pathway node is registered in the bypass pathway node address setting part 3031 of the interlink nodes 1a and 1b of the first ring. Since a bypass pathway node 2d is present in the second ring, an RPR address of the bypass pathway node 2d is registered in the bypass pathway node address setting part 3031 of the interlink node 2a of the second ring. Similarly, an RPR address of the bypass pathway node 3b is registered in the bypass pathway node address setting part 3031 of the interlink node 3a of the third ring.

In addition, for the first exemplary embodiment, the number of the bypass pathway nodes arranged in one ring (RPR network) is 1 at a maximum. Accordingly, the number of the RPR addresses of the bypass pathway node registered in the bypass pathway node address setting part 3031 is 1 at a maximum.

The interlink fault detection circuit 3034 determines the state of its own interlink node as an interlink fault (the state allowing no transmission and reception of packets through an interlink) in the case of detecting a fault of the interlink in the MAC/PHY circuit 3015 such as optical input discontinuance from the input port 3012-1. And the interlink fault detection circuit 3034 outputs a notice that an interlink fault has occurred to the address table invalidation notifying packet generating circuit 3032 and to the interlink fault notifying packet generating circuit 3033, and invalidate (for example, deletes) the address tale of its own node. In other words, that notification of the interlink fault is an interlink fault notifying packet generation and transmission request.

The address table invalidation notifying packet generating circuit 3032 is notified of an interlink fault by the interlink fault detection circuit 3034 which has detected an interlink fault and, then, generates and transmits an address table invalidation notifying packet to all RPR nodes inside the RPR network to which its own node belongs to the control packet processing circuit 3020. For example, address table invalidation notifying packet is preferably generated to the RPR MAC address as a destination each for all RPR MAC addresses registered in the topology database. The address table invalidation notifying packet is a packet instructing address table invalidation.

When an address table invalidation notifying packet to each RPR node is transmitted from the address table invalidation notifying packet generating circuit 3032 of its own node, the control packet processing circuit 3020 transmits the address table invalidation notifying packet to a ringlet through the multiplexing circuit 3003 or the multiplexing circuit 3004.

In addition, forwarding circuits 3001 and 3002 receive an address table invalidation notifying packet from the ringlet and, then, transmits the address table invalidation notifying packet to the control packet processing circuit 3020. The control packet processing circuit 3020 transmits the address table invalidation notifying packet transmitted from the forwarding circuits 3001 and 3002 to the address table invalidation notifying packet receiving circuit 3035.

When the address table invalidation notifying packet is transmitted from the control packet processing circuit 3020, the address table invalidation notifying packet receiving circuit 3035 invalidates the address table stored in the address table storage part 3010. For example, the address tables stored in the address table storage part 3010 are all cleared. Here, the case where the address tables are cleared has been exemplified. But the aspect of invalidation of the address tables can be another aspect.

The interlink fault notifying packet generating circuit 3033 is notified of an interlink fault by the interlink fault detection circuit 3034 having detected the interlink fault and, then, refers to the bypass pathway node address setting part 3031 to read an RPR address of a bypass pathway node if that RPR address is registered. The interlink fault notifying packet generating circuit 3033 generates and transmits the interlink fault notifying packet addressed to the RPR address of that bypass pathway node to the control packet processing circuit 3020. The interlink fault notifying packet is a packet for notifying an occurrence of an interlink fault.

The control packet processing circuit 3020 receives an inbound interlink fault notifying packet transmitted by the interlink fault notifying packet generating circuit 3033 of its own node and, then transmits that interlink fault notifying packet to a ringlet through the multiplexing circuit 3003 or the multiplexing circuit 3004.

Figure 9:
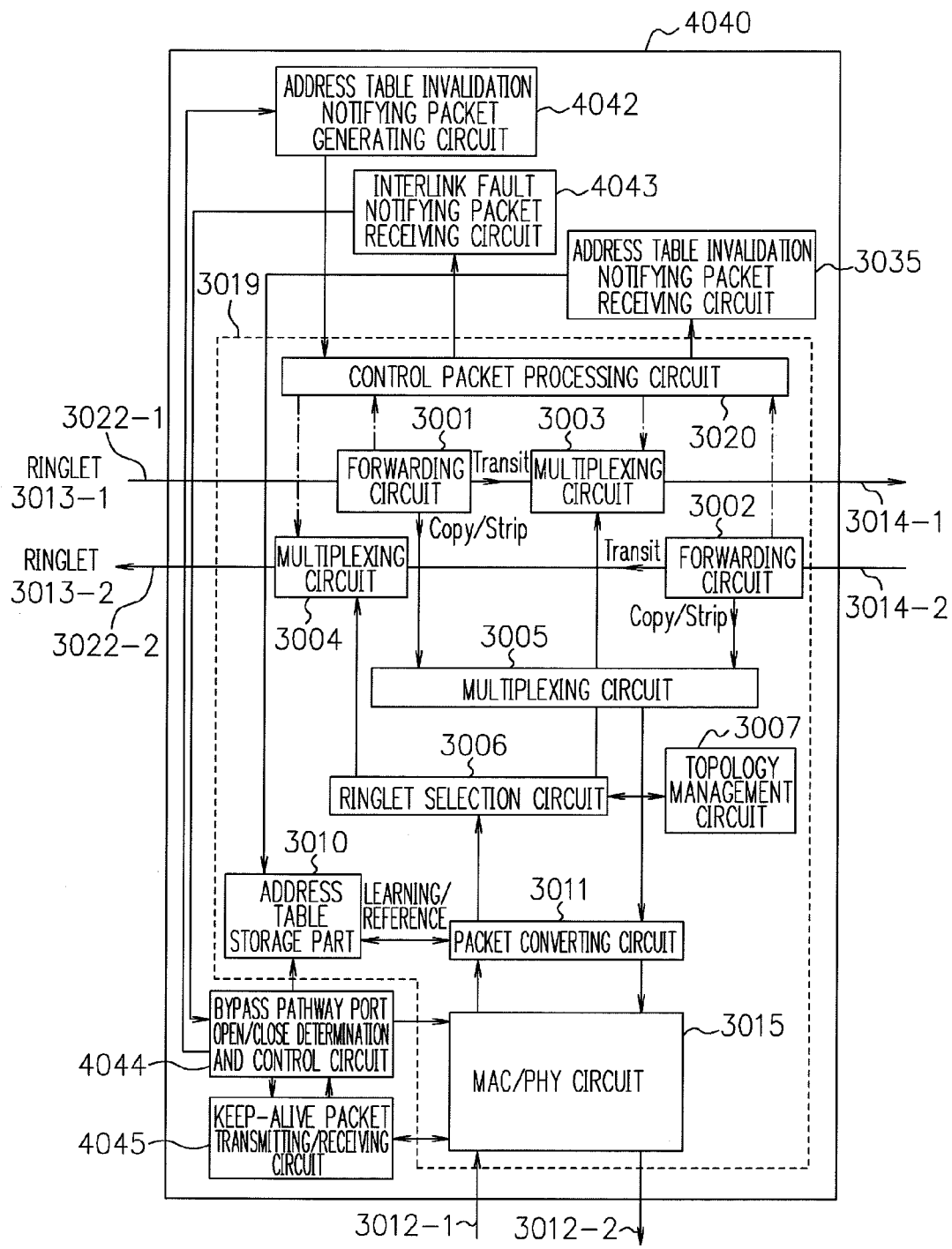
FIG. 9 is a block diagram exemplifying a bypass pathway node configuration in an exemplary embodiment of the present invention.

Next, a configuration of a bypass pathway node will be described. FIG. 9 is a block diagram exemplifying a bypass pathway node configuration in the first exemplary embodiment of the present invention. Bypass pathway node 4040 illustrated in FIG. 9 is arranged as the bypass pathway nodes 2d and 3b illustrated in FIG. 7. Here, a client of a bypass pathway node is a bypass pathway node arranged in another RPR network. Client ports 3012-1 and 3012-2 of a bypass pathway node are connected to client ports of the opposite bypass pathway node.

The bypass pathway node 4040 comprises an RPR basic node part 3019, an address table invalidation notifying packet generating circuit 4042, an interlink fault notifying packet receiving circuit 4043, a bypass pathway port open/close determination and control circuit 4044, a keep-alive packet transmitting/receiving circuit 4045 and an address table invalidation notifying packet receiving circuit 3035.

Figure 2:
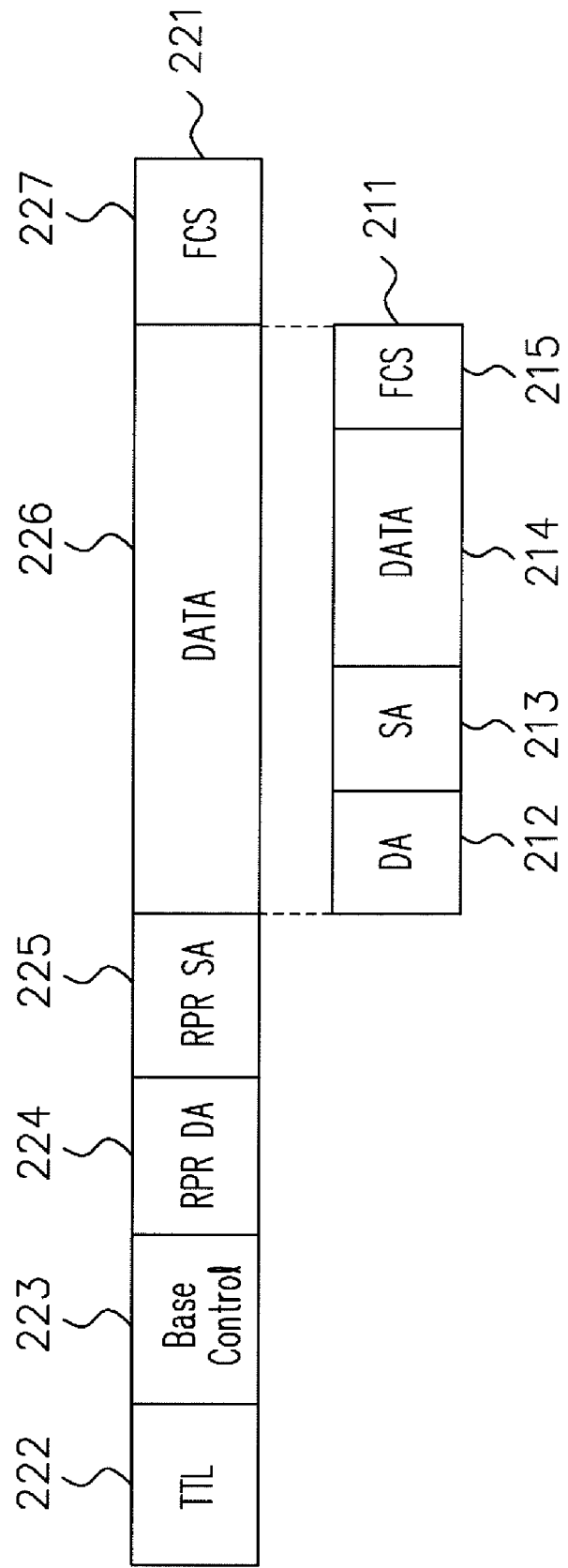
FIG. 2 is an explanatory diagram illustrating an RPR format.
Figure 3:
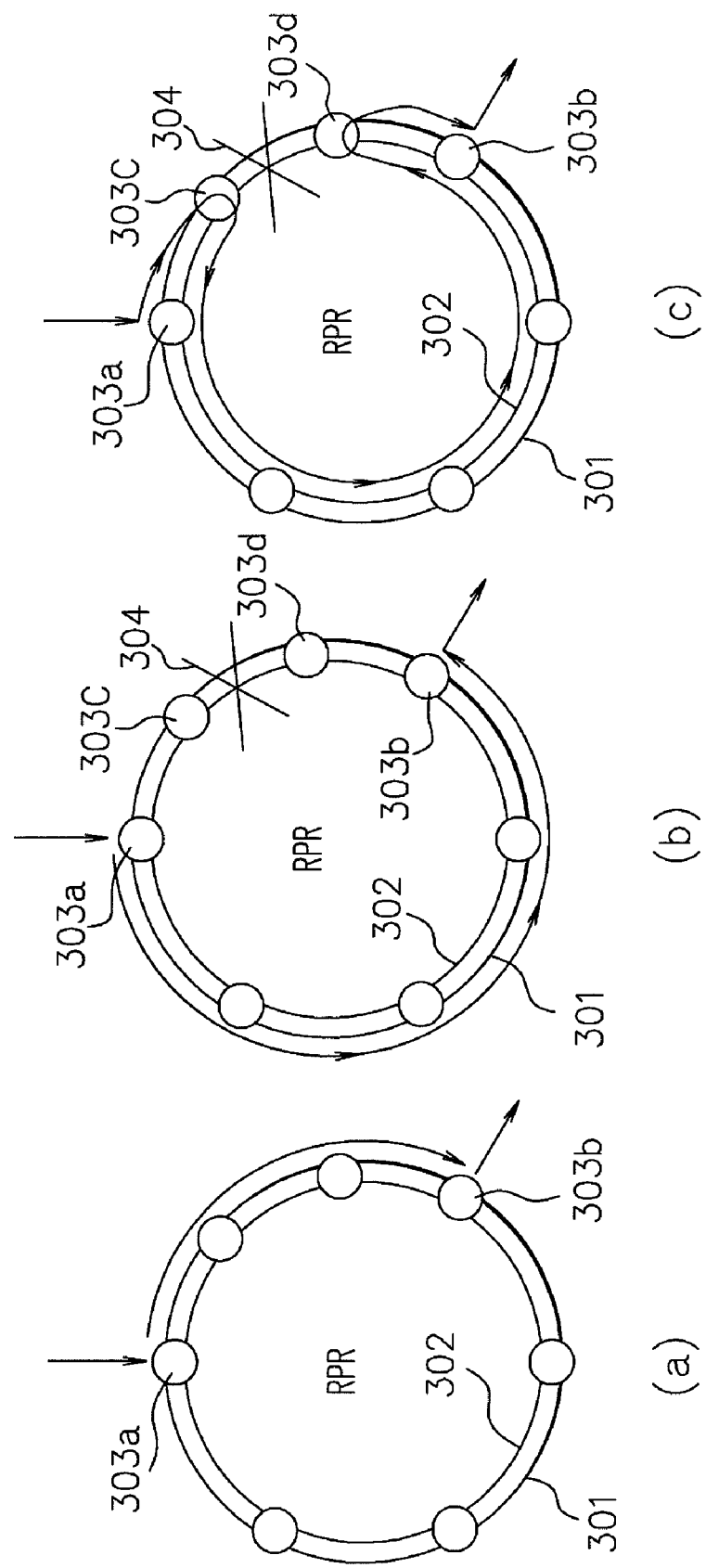
FIG. 3 is a diagram exemplifying a protection operation of an RPR at the time of a link fault.
Figure 4:
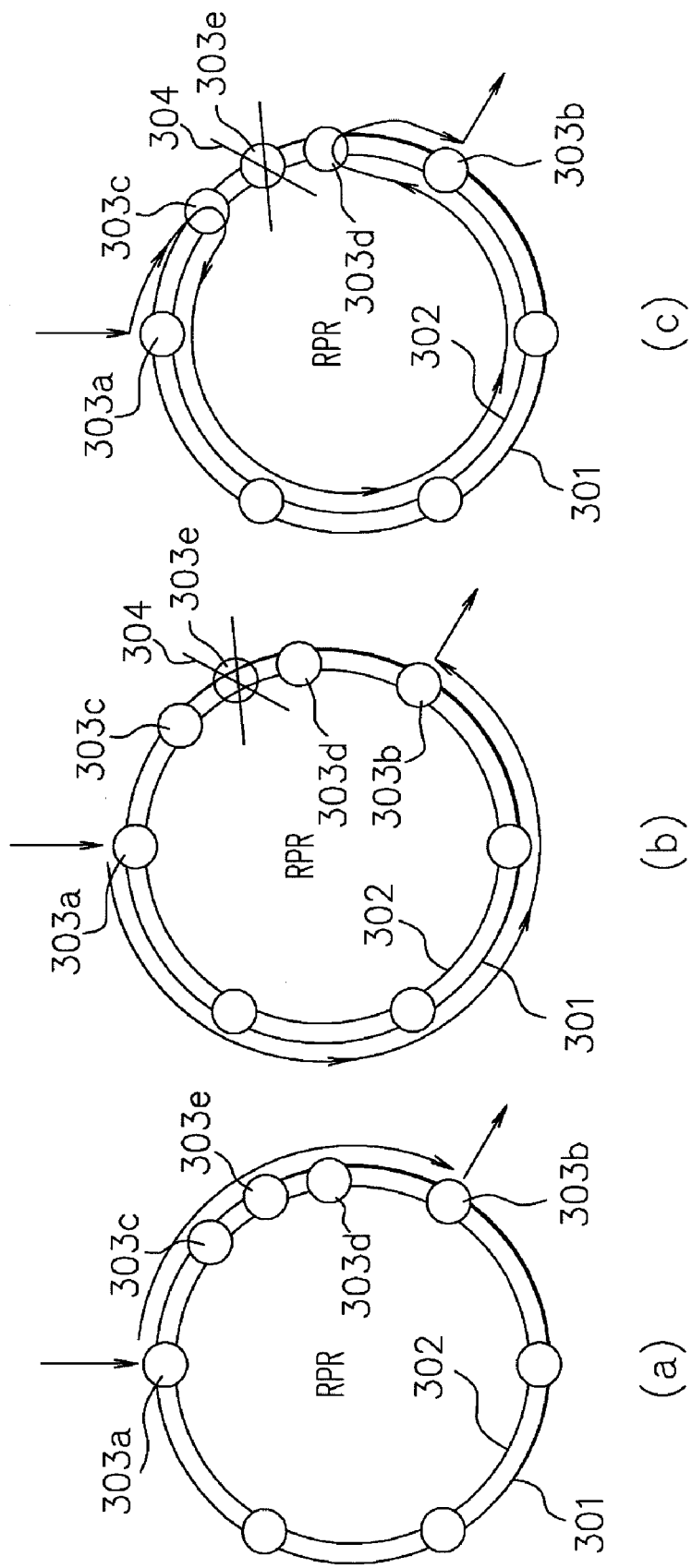
FIG. 4 is a diagram exemplifying a protection operation of an RPR at the time of a node fault.

A configuration of the RPR basic node part 3019 of the bypass pathway node is similar to the configuration of the RPR basic node part 3019 of the interlink node. The same numerals as in FIG. 8 designate the respective same components which the RPR basic node part 3019 of the bypass pathway node comprises and description thereon will be omitted. In addition, an operation of the address table invalidation notifying packet receiving circuit 3035 which the bypass pathway node 4040 comprises is similar to the operation of the address table invalidation notifying packet receiving circuit 3035 which the interlink node comprises. The address table invalidation notifying packet receiving circuit will be described also by applying the same numerals as in FIG. 2.

In addition, the MAC/PHY circuit 3015 of the bypass pathway node is controlled to enter a closed state or an open state with the bypass pathway port open/close determination and control circuit 4044. The closed state is a state where no client packet communication is carried out with a node of another ring (that is, an opposite node) to which the self-node is connected. Specifically, the closed state is a state of disposing a client packet even if the client packet is received from the port 3012-1 and disposing a client packet even if the inbound client packet is transmitted from the packet converting circuit 3011. However, even in the closed state, transmission and reception of the keep-alive packet are carried out with the opposite bypass pathway node. On the other hand, the open state is a state where client packet communication is carried out with a node of another ring (that is, an opposite node) to which the self-node is connected. Specifically, the open state is a state of transmitting a client packet to the packet converting circuit 3011 when the client packet from the port 3012-1 is received and transmitting a client packet from the port 4012-2 when the inbound client packet is transmitted from the packet converting circuit 3011.

Here, forwarding circuits 3001 and 3002 of the bypass pathway node receive an interlink fault notifying packet transmitted by an interlink node which belongs to the same ring as the ring of the self-node (RPR network) and, then, transmits that interlink fault notifying packet to the control packet processing circuit 3020. The control packet processing circuit 3020 transmit the inbound interlink fault notifying packet transmitted from the forwarding circuits 3001 and 3002 to the interlink fault notifying packet receiving circuit 4043.

The interlink fault notifying packet receiving circuit 4043 receives an interlink fault notifying packet from the control packet processing circuit 3020 and then determines that a fault has occurred in an interlink between the ring to which the self-node belongs and another ring and notifies the bypass pathway port open/close determination and control circuit 4044 of an occurrence of a fault in the interlink.

The keep-alive packet transmitting/receiving circuit 4045 receives a request for transmission of the keep-alive packet from the bypass pathway port open/close determination and control circuit 4044 and, then consecutively transmits the keep-alive packet from the transmission side bypass pathway port 3012-2 via the MAC/PHY circuit 3015 in a set time interval. In addition, the keep-alive packet transmitting/receiving circuit 4045 receives a request for stopping transmission of the keep-alive packet from the bypass pathway port open/close determination and control circuit 4044 and, then stops transmission of the keep-alive packet. In addition, the keep-alive packet transmitting/receiving circuit 4045 receives the keep-alive packet from the reception side bypass pathway port 3012-1 via the MAC/PHY circuit 3015 and measures the keep-alive arrival time interval and, determines that the state of receiving no keep-alive (hereinafter to be referred to as keep alive discontinuance) has been established in the case where no reception of the keep-alive packet for not less than set time and outputs, to the bypass pathway port open/close determination and control circuit 4044, a notice that the keep alive discontinuance has been established.

The bypass pathway port open/close determination and control circuit 4044 determines whether or not client packet communication with the bypass pathway node of another ring brought into connection through a bypass pathway is carried out. Specifically, it is determined whether or not MAC/PHY circuit 3015 enters an open state or a closed state. In the case where the bypass pathway port open/close determination and control circuit 4044 has received no notice of an occurrence of a fault in an interlink between the ring to which the self-node belongs and another ring from the interlink fault notifying packet receiving circuit 4043 and no notice of keep alive discontinuance from the keep-alive packet transmitting/receiving circuit 4045 and, the MAC/PHY circuit 3015 is set to the closed state. And, after receiving any of the above described two notices, the MAC/PHY circuit 3015 is set to an open state.

That is, in the case of receiving a notice of an occurrence of a fault in an interlink between the ring to which the self-node belongs and another ring from the interlink fault notifying packet receiving circuit 4043, the bypass pathway port open/close determination and control circuit 4044 brings the MAC/PHY circuit 3015 into the open state.

In addition, when a notice of keep alive discontinuance is input from the keep-alive packet transmitting/receiving circuit 4045, the bypass pathway port open/close determination and control circuit 4044 determines that an interlink fault has occurred in the RPR network to which the opposite bypass pathway node (bypass pathway node to which the self-node is connected) belongs. In that case, MAC/PHY circuit 3015 is set to an open state. In addition, in the case of determination that an interlink fault has occurred in the RPR network to which the opposite bypass pathway node belongs, the bypass pathway port open/close determination and control circuit 4044 outputs a request for generation and transmission of address table invalidation notifying packet to the address table invalidation notifying packet generating circuit 4042 and, invalidates (for example, deletes) the address table of the self-node.

In addition, the bypass pathway port open/close determination and control circuit 4044 outputs a request for transmission of a keep-alive packet to the keep-alive packet transmitting/receiving circuit 4045 according to an instruction of a manager, for example. The bypass pathway port open/close determination and control circuit 4044 is instructed to output a request for keep-alive packet transmission by provisioning. That is, an information processing apparatus (not illustrated in the drawing) such as a personal computer and the like carrying out various types of setting for a node is connected to a node in advance and, through that information processing apparatus is instructed to output a request for keep-alive packet transmission by the manager. The bypass pathway port open/close determination and control circuit 4044 is instructed by the manager to output a request for transmission of a keep-alive packet and outputs a request for transmission of a keep-alive packet when starting up the packet ring network system. Similarly, also in the case where the interlink 5012 or the interlink 5011 gets normal to restore the packet ring network system after the interlink 5012 or the interlink 5011 (see FIG. 7) gets incapable of transmission to start packet communication via the bypass pathway 5010, a request for transmission of the keep-alive packet is output corresponding to an instruction of the manager.

In addition, the bypass pathway port open/close determination and control circuit 4044 receives a notice of an occurrence of a fault in the interlink between the ring to which the self-node belongs and another ring from the interlink fault notifying packet receiving circuit 4043, and, then, outputs a request for halting transmission of a keep alive packet to the keep-alive packet transmitting/receiving circuit 4045.

The address table invalidation notifying packet generating circuit 4042 receives a request for generation and transmission of an address table invalidation notifying packet from the bypass pathway port open/close determination and control circuit 4044 and, then, generates and outputs, to the control packet processing circuit 3020, address table invalidation notifying packet addressed to all RPR nodes in the RPR network to which the self-node belongs. The control packet processing circuit 3020 transmits this address table invalidation notifying packet to the ringlet. An operation of this control packet processing circuit 3020 is similar to the operation of the control packet processing circuit 3020 which is provided to the interlink node.

When the address table invalidation notifying packet is transmitted from the control packet processing circuit 3020, the address table invalidation notifying packet receiving circuit 3035 invalidates the address table stored in the address table storage part 3010.

Figure 10:
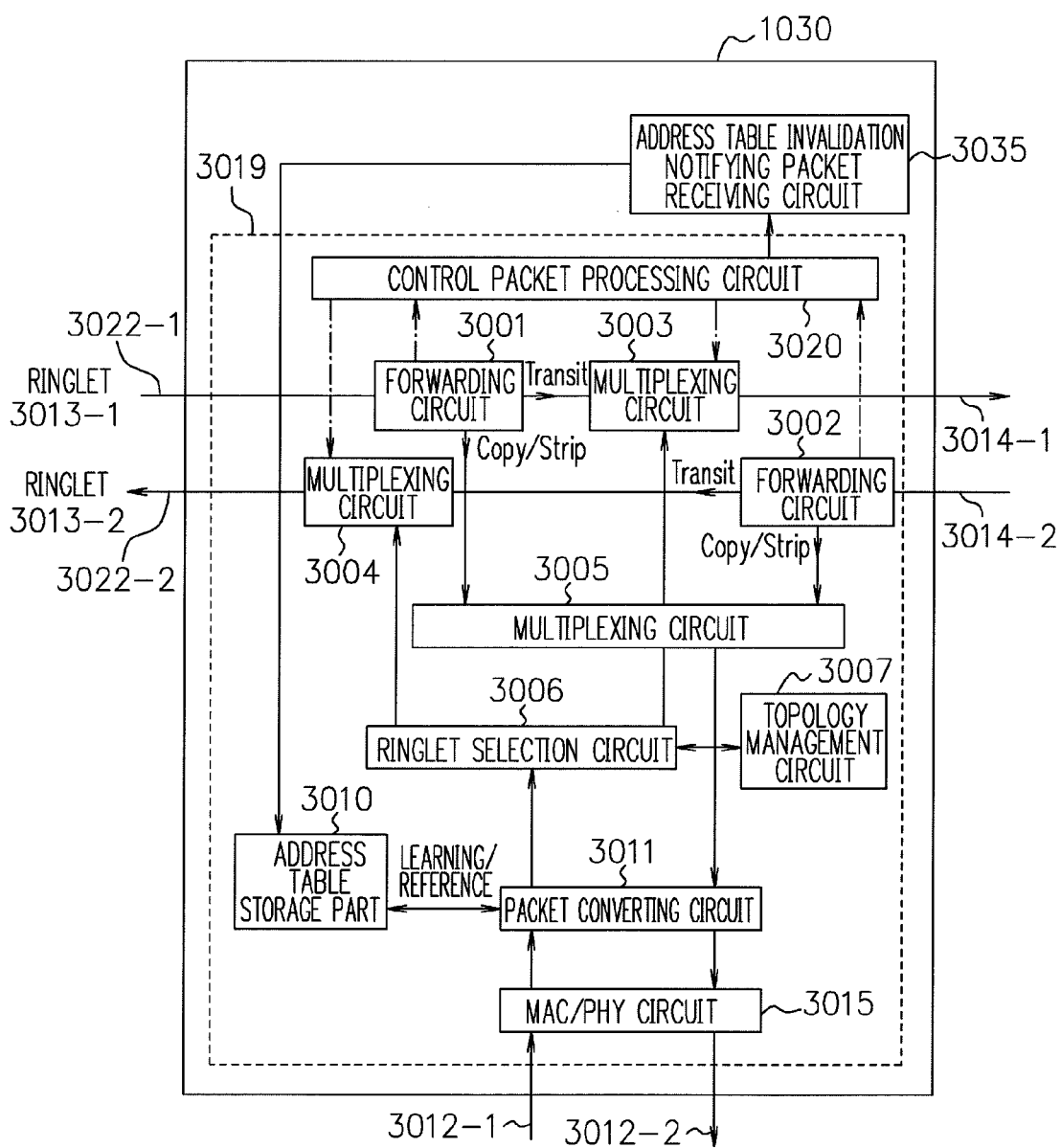
FIG. 10 is a block diagram exemplifying a basic node configuration in an exemplary embodiment of the present invention.

Next, a configuration of a basic node will be described. FIG. 10 is a block diagram exemplifying a basic node configuration in the first exemplary embodiment. A basic node 1030 illustrated in FIG. 10 is arranged as basic nodes 1*c*, 1*d*, 1*e*, 2*b*, 2*c*, 3*c* and 3*d* illustrated in FIG. 7. Here, a client of the basic node is a user terminal (not illustrated in the drawing). The client ports 3012-1 and 3012-2 of the basic node are connected to the user terminal.

The basic node 1030 comprises an RPR basic node part 3019 and an address table invalidation notifying packet receiving circuit 3035. A configuration of the RPR basic node part 3019 of the basic node is similar to the configuration of the RPR basic node part 3019 of the interlink node. The same numerals as in FIG. 8 designate the respective same components which the RPR basic node part 3019 comprises and description thereon will be omitted.

In addition, an operation of the address table invalidation notifying packet receiving circuit 3035 which the basic node 1030 comprises is similar to the operation of the address table invalidation notifying packet receiving circuit 3035 which the interlink node comprises. The address table invalidation notifying packet receiving circuit will be described also by applying the same numerals as in FIG. 8. When the address table invalidation notifying packet is transmitted from the control packet processing circuit 3020, the address table invalidation notifying packet receiving circuit 3035 invalidates the address table stored in the address table storage part 3010.

Here, the basic node (see FIG. 10), the interlink node (see FIG. 8) and the bypass pathway node (see FIG. 9) are described respectively as individual nodes. However, the configuration of the node can be a configuration providing one node with the components of the basic node, the interlink node and the bypass pathway node to allow use as any of the basic node, the interlink node and the bypass pathway node. In this case, setting of as which of the basic node, the interlink node and the bypass pathway node the node is used can be carried out by provisioning, for example. In addition, the setting can be carried out manually for the individual nodes being arranged in a ring form.

Next, setting of a packet ring network system illustrated in FIG. 7 will be described. As described above, a configuration of the node can be a configuration to provide one node with components of a basic node, an interlink node and bypass pathway node to allow use as any type of node. In that case, the nodes 1*a*, 2*a*, 1*b* and 3*a* are set as interlink nodes by provisioning and the like. Similarly, the nodes 2*d* and 3*b* are set as bypass pathway nodes and the other nodes are set as basic nodes.

In addition, in the case where the configuration of the interlink node, the bypass pathway node and the basic node is respectively different as exemplified in FIG. 8 to FIG. 10, the individual nodes can be arranged as exemplified in FIG. 7.

The first ring 5001 and the second ring 5002 are brought into connection with an interlink 5012. The first ring 5001 and the third ring 5003 are brought into connection with an interlink 5011. The MAC/PHY circuit 3015 (see FIG. 8) of the respective interlink nodes 1*a*, 2*a*, 1*b* and 3*a* is always in an open state. The interlinks 5012 and 5011 are used as pathways where a client packet is transported unless a fault occurs.

In addition, a bypass pathway node 2*d* of a second ring and a bypass pathway node 3*b* of a third ring are brought into connection with a bypass pathway link 5010. In the state where no interlink fault occurs in the interlinks 5012 and 5011 (interlink normal state), no notice that a fault has occurred in the interlink between the ring to which the self-node belongs and the other ring is input to the bypass pathway port open/close determination and control circuit 4044 (see FIG. 9). Accordingly, the bypass pathway port open/close determination and control circuit 4044 of the bypass pathway nodes 2*d* and 3*b* controls the MAC/PHY circuit 3015 to enter a closed state. Accordingly, the bypass pathway 5010 is not used as transport pathway of the client packet. Here, the keep-alive packet is transmitted and received through the bypass pathway 5010.

The second ring and the third ring to which the interlink nodes 21 and 3*a* belong includes a bypass pathway node. Accordingly, an RPR address of the bypass pathway node 2*d* belonging to the same ring as the ring to which the self-node belongs is registered in the bypass pathway node address setting part 3031 of the interlink node 2*a* (see FIG. 8). Similarly, an RPR address of the bypass pathway node 3*b* belonging to the same ring as the ring to which the self-node belongs is registered in the bypass pathway node address setting part 3031 of the interlink node 3*a*. That registration is carried out, for example, by a manager in advance. In addition, the first ring to which the interlink nodes 1*a* and 1*b* belong includes no bypass pathway node. Accordingly, the interlink nodes 1*a* and 1*b* are not registered in the bypass pathway node address setting part 3031. The above described setting enables the interlink nodes 2*a* and 3*a* to recognize the presence of the bypass setting node in the RPR ring to which the self-node belongs and the RPR address of that bypass pathway node. On the other hand, the addresses of the interlink nodes 1*a* and 1*b* are not registered in the bypass pathway node address setting part 3031 and, thereby, it can be recognized that no bypass pathway node is present in the RPR ring to which the self-node belongs.

In addition, the bypass pathway port open/close determination and control circuits 4044 of the respective bypass pathway nodes 2*d* and 3*b* outputs a request for keep-alive packet transmission to the keep-alive packet transmitting/receiving circuit 4045 by provisioning. Thereafter, the keep-alive packet transmitting/receiving circuit 4045 generates and outputs a keep-alive packet from the MAC/PHY circuit 3015 to the bypass pathway 5010 in a constant time interval.

Next, an operation will be described.

Figure 12:
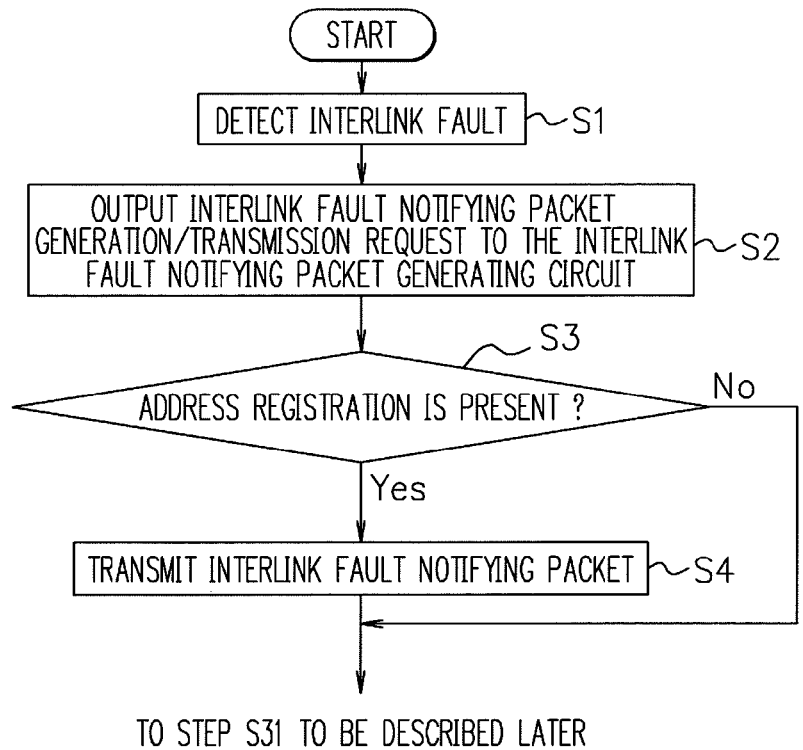
FIG. 12 is a flow chart illustrating an operation of an interlink node notifying a bypass pathway node of a fault occurrence in an interlink in an exemplary embodiment of the present invention.

At first, an operation of the interlink node, which detects a fault occurrence of an interlink to notify the bypass pathway node of the occurrence will be described. FIG. 11 is an explanatory diagram illustrating the state where a fault occurs in an interlink. FIG. 11A illustrates the state where the interlink node brought into connection through an interlink, in which a fault occurs, transmits an interlink fault notifying packet. In addition, FIG. 12 is a flow chart illustrating an operation of an interlink node notifying a bypass pathway node of a fault occurrence in an interlink. The case where a fault occurs in the interlink 5011 as illustrated in FIG. 11 will be described below as an example.

The interlink nodes 1b and 3a, which are brought into connection through the interlink 5011, will be operated as described below. The interlink fault detection circuit 3034 of the interlink nodes 1b and 3a detects an occurrence of a fault in the interlink 5011 (step S1). The interlink fault detection circuit 3034 detects, for example, that light being input from the port 3012-1 to the MAC/PHY circuit 3015 establishes discontinuance and, thereby, detects that an interlink fault (discontinuance and the like) has occurred.

The interlink fault detection circuit 3034 detects an occurrence of a fault in the interlink and, then, outputs an interlink fault notifying packet generation/transmission request to the interlink fault notifying packet generating circuit 3033 (step S2). The interlink fault notifying packet generating circuit 3033, to which this request is input, refers to the bypass pathway node address setting part 3031 to determine whether or not an RPR address is registered (step S3).

In the case where an RPR address is registered in the bypass pathway node address setting part 3031 ("Yes" in the step S3), the interlink fault notifying packet generating circuit 3033 determines that a bypass pathway node is present in the RPR network to which the self-node belongs. The interlink fault notifying packet generating circuit 3033 generates an interlink fault notifying packet addressed to its RPR address and transmits the packet to the ringlet through the control packet processing circuit 3020 and the multiplexing circuit 3003 (or multiplexing circuit 3004) (step S4). In the step S4, the interlink fault notifying packet generating circuit 3033 outputs the generated interlink fault notifying packet to the control packet processing circuit 3020. The control packet processing circuit 3020 causes the multiplexing circuit 3003 or the multiplexing circuit 3004 to multiplex the interlink fault notifying packet having been input as an OAM Organization Specific packet defined under IEEE802.17 and to transmit the result to the ringlet.

On the other hand, in the case where no RPR address is registered in the bypass pathway node address setting part 3031, the interlink fault notifying packet generating circuit 3033 generates no interlink fault notifying packet.

In an exemplary embodiment illustrated in FIG. 11A, the RPR address of the bypass pathway node 3b is registered in the bypass pathway node address setting part 3031 of the interlink node 3a. However, no RPR address is registered in the bypass pathway node address setting part 3031 of the interlink node 1b. Therefore, the interlink node 3a carries out the processing of the steps S1 to S4. However, the interlink node 1b does not carry out the step S4 after having carried out the steps S1 to S3.

Here, as in the first exemplary embodiment, in the case where the number of the bypass pathway nodes arranged in one ring (RPR network) is 1 at a maximum, information on presence of a bypass pathway node in an RPR ring to which the self-node belongs can be registered instead of registering an address in the bypass pathway node address setting part 3031. And in the step S3, presence of a bypass pathway node in an RPR ring to which the self-node belongs is confirmed based on that information. In the case where a bypass pathway node is present, the processing in the step S4 can be carried out. However, in this case, in the step S4, the interlink fault notifying packet generating circuit 3033 does not specify the address of the interlink fault notifying packet but undergoes flooding.

Figure 13:
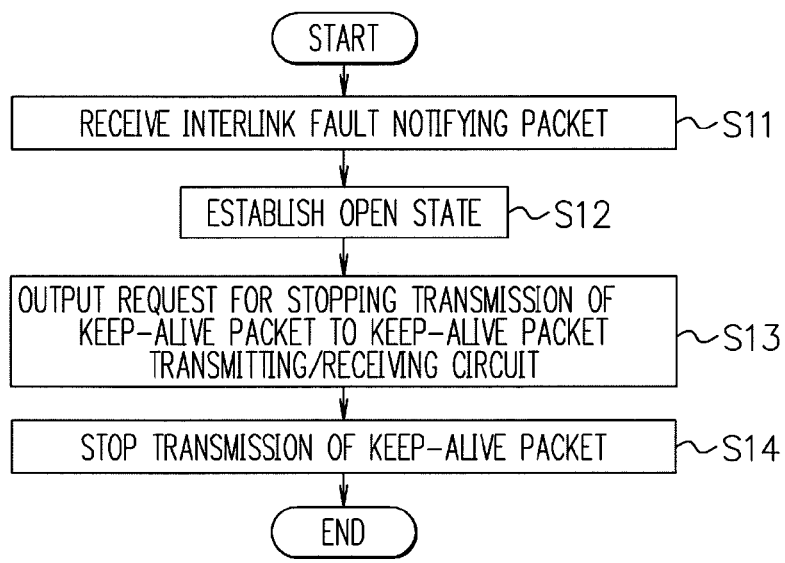
FIG. 13 is a flow chart illustrating an operation of a bypass pathway node receiving an interlink fault notifying packet in an exemplary embodiment of the present invention.

Next, an operation of the bypass pathway node (here, the bypass pathway node 3b) which receives an interlink fault notifying packet from the interlink node in the ring to which the self-node belongs will be described. FIG. 13 is a flow chart illustrating an operation of a bypass pathway node receiving an interlink fault notifying packet from the interlink node in the ring to which the self-node belongs.

The forwarding circuits 3001 and 3002 of the bypass pathway node 3b receive an interlink fault notifying packet from the interlink node 3a belonging to the same ring as the ring to which the self-node belongs and, then outputs that interlink fault notifying packet to the control packet processing circuit 3020. The control packet processing circuit 3020 outputs that interlink fault notifying packet to the interlink fault notifying packet receiving circuit 4043. Consequently, the interlink fault notifying packet receiving circuit 4043 receives an interlink fault notifying packet (step S1). The interlink fault notifying packet receiving circuit 4043 receives an interlink fault notifying packet and then determines that a fault has occurred in the interlink 5011 between the ring to which the self-node belongs and another ring and notifies the bypass pathway port open/close determination and control circuit 4044 of an occurrence of a fault in the interlink.

The bypass pathway port open/close determination and control circuit 4044 which has received this notice causes the state of the MAC/PHY circuit 3015 of the self-node to transit from the closed state to the open state (step S12). Moreover, the bypass pathway port open/close determination and control circuit 4044 outputs a request for halting transmission of the keep-alive packet to the keep-alive packet transmitting/receiving circuit 4045 (step S13). When the request for halting transmission of the keep-alive packet is input to the keep-alive packet transmitting/receiving circuit 4045, the keep-alive packet transmitting/receiving circuit 4045 stops generation and transmission of regular keep-alive packets which has continued until then (step S14). Consequently, the keep-alive packets having been transmitted regularly from the bypass pathway node 3b to the bypass pathway node 2d are discontinued.

Figure 14:
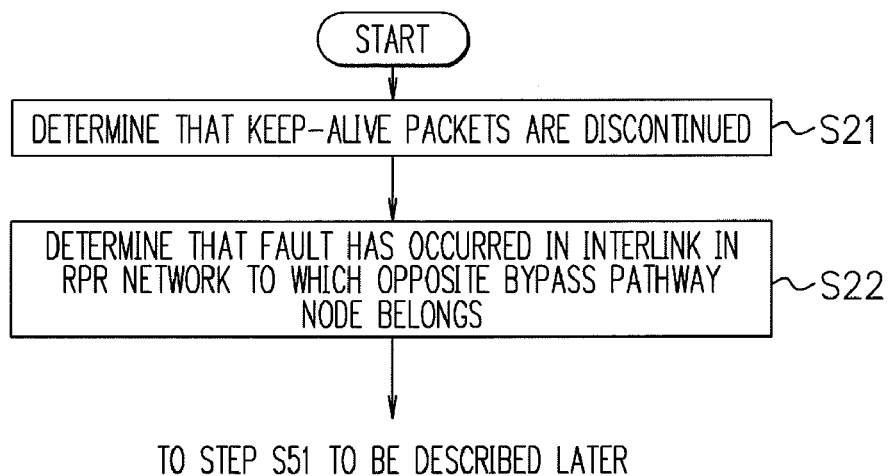
FIG. 14 is a flow chart illustrating an operation of a bypass pathway node in which reception of keep-alive packets has been discontinued in an exemplary embodiment of the present invention.

Next, an operation of a bypass pathway node (here, bypass pathway node 2d) in which reception of keep-alive packets is discontinued will be described. FIG. 14 is a flow chart illustrating an operation of a bypass pathway node in which reception of keep-alive packets has been discontinued.

The keep-alive packet transmitting/receiving circuit 4045 of the bypass pathway node 2d receives the keep-alive packet from the port 3012-1 via the MAC/PHY circuit 3015 and measures keep-alive packet reception hold time from reception of a keep-alive packet to reception of the next keep-alive packet. The keep-alive packet reception hold time gets longer if the state where no keep-alive packet is received lasts. When keep-alive packet reception hold time reaches not less than a predetermined threshold value, the keep-alive packet transmitting/receiving circuit 4045 determines that keep-alive packet is absent (step S21). And a notice that keep alive absence has occurred is output to the bypass pathway port open/close determination and control circuit 4044.

This notice is input to the bypass pathway port open/close determination and control circuit 4044 and, thereby, the bypass pathway port open/close determination and control circuit 4044 determines that an interlink fault has occurred in the ring (RPR network) to which the opposite bypass pathway node belongs (step S22).

As described above, when a fault occurs in an interlink 5001, the interlink nodes 3a and 1b detect the interlink fault at first. And, the interlink node 3a including the bypass pathway node being present in the same ring as the ring to which the self-node belongs to, transmits the interlink fault notifying packet to that bypass pathway node 3b. Consequently, the bypass pathway node 3b determines that a fault has occurred in the interlink 5011 between the ring to which the self-node belongs and the other ring. And, the bypass pathway node 3b stops transmission of the keep-alive packets. Thereby, the bypass pathway node 2d no longer receives the keep-alive packets. Consequently, the bypass pathway node 2d determines that an interlink fault has occurred in the ring to which the opposite bypass pathway node belongs. Thus, not only the bypass pathway node 3b in the RPR network connected to the interlink 5011 in which a fault has occurred but also the bypass pathway node 2d connected to that bypass pathway node 3b can determines that a fault has occurred in the interlink 5011.

Next, an operation of a process of packet transport pathway reestablishment after an interlink fault occurrence will be described. As described above, after an interlink fault occurrence in the interlink 5011, the interlink nodes 1b and 3a detect that fault and the bypass pathway nodes 3b and 2d determine that a fault has occurred in the interlink in the ring to which the bypass pathway node 3b belongs. In addition, FIG. 11B is an explanatory diagram illustrating the state where the interlink nodes 1b and 3a and the bypass pathway node 2d transmit the address table invalidation notifying packet with an operation to be described below.

Figure 15:
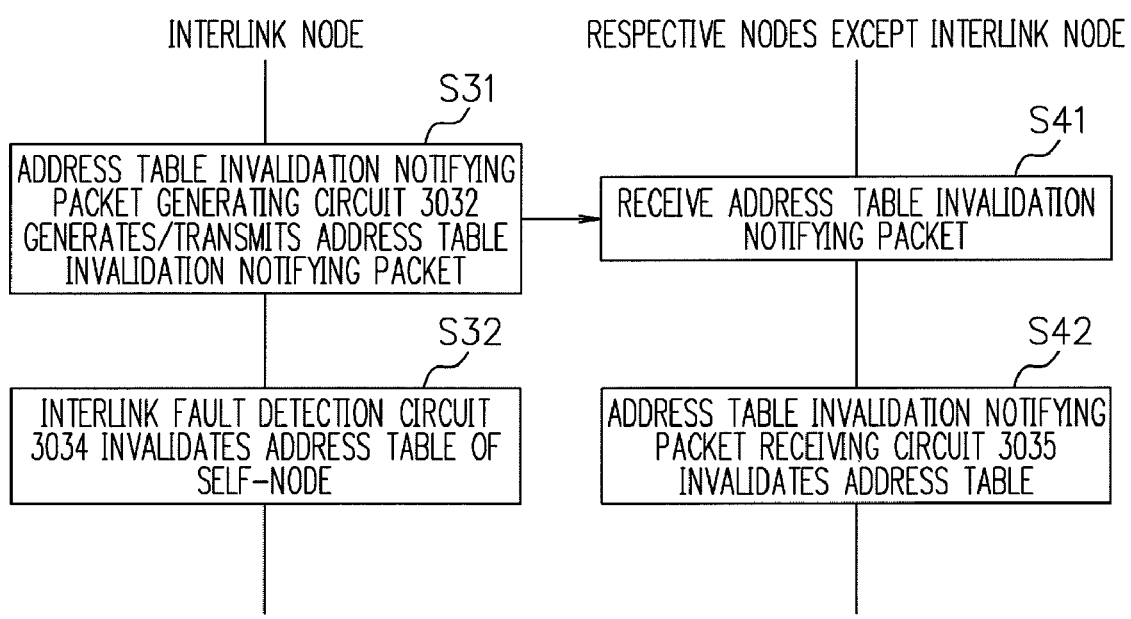
FIG. 15 is a flow chart in an exemplary embodiment of the present invention illustrating an operation of an interlink node in the case where a fault has been detected in an interlink and an operation of another node belonging to the same ring as that interlink node does.

An operation of the nodes in the respective rings where a fault has been detected in the interlink 5011 and to which the interlink nodes 1b and 3a belong will be described. FIG. 15 is a flow chart illustrating an operation of an interlink node in the case where a fault has been detected in an interlink and an operation of another node belonging to the same ring as that interlink node does.

An operation of the respective nodes in the first ring to which the interlink node 1b belongs will be described. After detecting a fault in the interlink 5011, the interlink fault detection circuit 3034 of the interlink node 1b outputs an interlink fault notifying packet generation and reception request (notice that an interlink fault has occurred) to the address table invalidation notifying packet generating circuit 3032. When an interlink fault notifying packet generation and transmission request is input, the address table invalidation notifying packet generating circuit 3032 generates an address table invalidation notifying packet and transmits the packet to the ringlet through one or both of the control packet processing circuit 3020 and the multiplexing circuits 3003 and 3004 (step S31). In the step S31, the address table invalidation notifying packet generating circuit 3032 generates an address table invalidation notifying packet addressed to the RPR addresses of the respective nodes in the first ring to which the self-node belongs and outputs the packet to the control packet processing circuit 3020. At that time, the address table invalidation notifying packet addressed to the RPR MAC address can be generated respectively for all RPR MAC addresses registered, for example, in the topology database. Taking the respective address table invalidation notifying packets thereof as OAM Organization Specific packets, the control packet processing circuit 3020 causes one or both of the multiplexing circuit 3003 and the multiplexing circuit 3004 to multiplex those packets and to transmit the result to the ringlet. In the step S31, the address table invalidation notifying packet undergoes flooding.

In addition, the interlink fault detection circuit 3034 invalidates the address table of the interlink node 1b itself (step S32). For example, the address tables stored in the address table storage part 3010 are all cleared.

Among the nodes belonging to the first ring, the address table invalidation notifying packet receiving circuits 3035 of the respective nodes 1a, 1c, 1d and 1e besides the interlink node 1b having transmitted the address table invalidation notifying packet receive an address table invalidation notifying packet addressed to the self-node (step S41). Specifically, the forwarding circuit 3001 or the forwarding circuit 3002 receives an address table invalidation notifying packet at first and outputs the packet to the control packet processing circuit 3020. And the address table invalidation notifying packet receiving circuit 3035 receives an address table invalidation notifying packet from the control packet processing circuit 3020.

The address table invalidation notifying packet receiving circuit 3035 having received an address table invalidation notifying packet invalidates the address table of the self-node (step S42). For example, the address tables stored in the address table storage part 3010 are all cleared.

Next, an operation of the respective nodes in the second ring to which the interlink node 3a belongs will be described. After detecting a fault in the interlink 5011, the interlink fault detection circuit 3034 of the interlink node 3a outputs an interlink fault notifying packet generation and reception request to the address table invalidation notifying packet generating circuit 3032. When an interlink fault notifying packet generation and reception request is input, the address table invalidation notifying packet generating circuit 3032 generates an address table invalidation notifying packet and outputs the packet to the ringlet through one or both of the control packet processing circuit 3020 and the multiplexing circuit 3003 and 3004 (step S31). In addition, the interlink fault detection circuit 3034 invalidates the address table of the interlink node 3a itself (step S32). For example, the address tables stored in the address table storage part 3010 are all cleared. The above described operation of the interlink node 3a is similar to the operation which the interlink node 1b carries out in the steps S31 and S32.

Among the nodes belonging to the third ring, the address table invalidation notifying packet receiving circuits 3035 of the respective nodes 3b, 3c and 3d besides the interlink node 3a having transmitted the address table invalidation notifying packet receive an address table invalidation notifying packet addressed to the self-node (step S41). The address table invalidation notifying packet receiving circuit 3035 having received an address table invalidation notifying packet invalidates the address table of the self-node (step S42). For example, the address tables stored in the address table storage part 3010 are all cleared. The above described operation in the respective nodes 3b, 3c and 3d is similar to the operation of the nodes 1a, 1c, 1d and 1e in the first ring.

Here, the processing in the step S32 illustrated in FIG. 15 can be carried out prior to the step S31.

Figure 16:
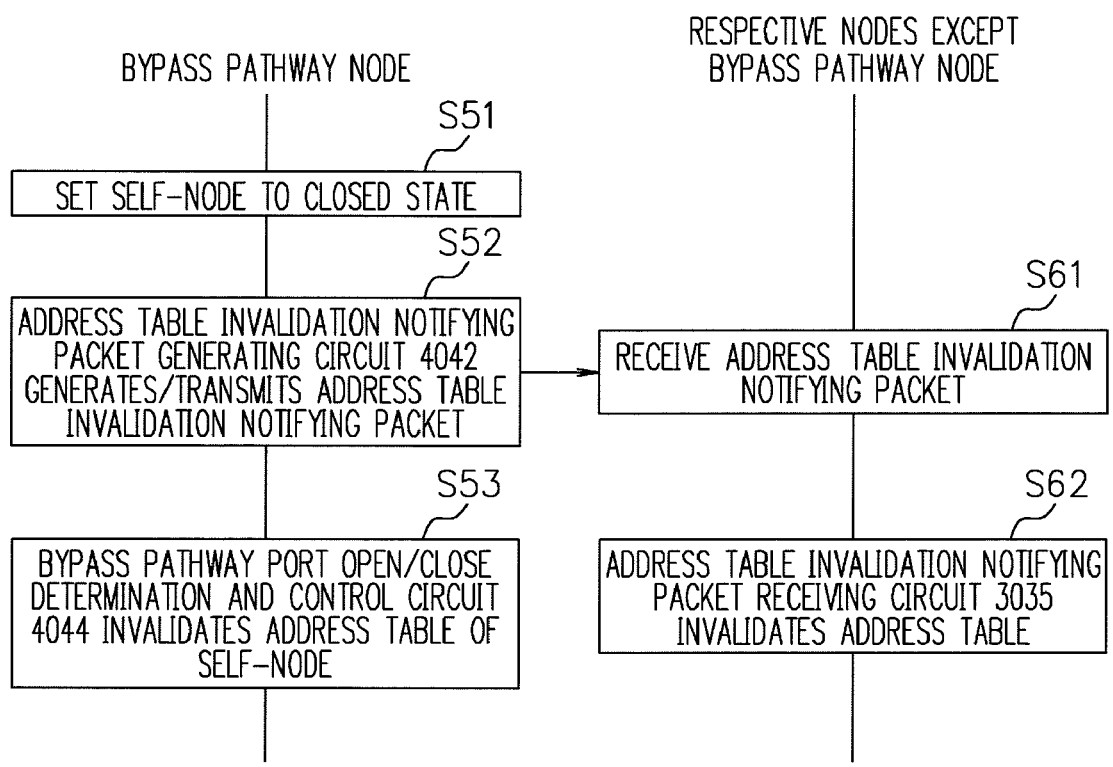
FIG. 16 is a flow chart in an exemplary embodiment of the present invention illustrating an operation of a bypass pathway node in the case where a fault has been detected to have occurred in an interlink in a ring to which an opposite bypass pathway node belongs and an operation of another node belonging to the same ring as the ring to which that bypass pathway node belongs.

Next, an operation of the respective nodes in the second ring to which the bypass pathway node 2d belongs will be described. FIG. 16 is a flow chart illustrating an operation of a bypass pathway node in the case where a fault has been determined to have occurred in an interlink in a ring to which an opposite bypass pathway node belongs and an operation of another node belonging to the same ring as the ring to which that bypass pathway node belongs.

The bypass pathway port open/close determination and control circuit 4044 of the bypass pathway node 2d determines that a fault has occurred in the interlink 5011 in the step S22 (see FIG. 14) and, thereafter, causes the state of the MAC/PHY circuit 3015 of the self-node to transit from the closed state to the open state (step S51).

In addition, the bypass pathway port open/close determination and control circuit 4044 outputs an interlink fault notifying packet generation and transmission request (notice that an interlink fault has occurred) to the address table invalidation notifying packet generating circuit 4042. When an interlink fault notifying packet generation and transmission request is input, the address table invalidation notifying packet generating circuit 4042 generates an address table invalidation notifying packet and transmits the packet to the ringlet through one or both of the control packet processing circuit 3020 and the multiplexing circuits 3003 and 3004 (step S52). In the step S52, the address table invalidation notifying packet generating circuit 4042 generates an address table invalidation notifying packet addressed to the RPR addresses of the respective nodes in the second ring to which the self-node belongs and outputs the packet to the control packet processing circuit 3020. At that time, the address table invalidation notifying packet addressed to the RPR MAC address can be generated respectively for all RPR MAC addresses registered, for example, in the topology database. Taking the respective address table invalidation notifying packets thereof as OAM Organization Specific packets, the control packet processing circuit 3020 causes one or both of the multiplexing circuit 3003 and the multiplexing circuit 3004 to multiplex those packets and to transmit the result to the ringlet. In the step S52, the address table invalidation notifying packet undergoes flooding.

In addition, the bypass pathway port open/close determination and control circuit 4044 invalidates the address table of the bypass pathway node 2*d* itself (step S53). For example, the address tables stored in the address table storage part 3010 are all cleared.

Here, the order of processing in the steps S51 to S53 illustrated in FIG. 16 will not be limited in particular.

Among the nodes belonging to the second ring, the address table invalidation notifying packet receiving circuits 3035 of the respective nodes 2*a* to 2*c* besides the interlink node 2*d* having transmitted the address table invalidation notifying packet receive an address table invalidation notifying packet addressed to the self-node (step S61). Specifically, the forwarding circuit 3001 or the forwarding circuit 3002 receives an address table invalidation notifying packet at first and outputs the packet to the control packet processing circuit 3020. And the address table invalidation notifying packet receiving circuit 3035 receives an address table invalidation notifying packet from the control packet processing circuit 3020.

The address table invalidation notifying packet receiving circuit 3035 having received an address table invalidation notifying packet invalidates the address table of the self-node (step S62). For example, the address tables stored in the address table storage part 3010 are all cleared.

The operations of those steps S61 and S62 are similar to the operations in the steps S41 and S42 described in FIG. 15.

The address tables of the respective nodes belonging to the first to third rings respectively are invalidates by the above described operations. In addition, both bypass pathway nodes 2*d* and 3*b* are set to an open state.

In this state, the nodes belonging to the first to third rings respectively receive from the tributary port a client packet which a user terminal (not illustrated in the drawing) transmits and, then, encapsulates that client packet and causes the RPR packet to undergo flooding in the ring to which the self-node belongs.

Specifically, the MAC/PHY circuit 3015 receives a client packet from a user terminal and outputs the packet to the packet converting circuit 3011. The packet converting circuit 3011 refers to the address table to search for the RPR MAC address corresponding to the MAC DA of that client packet. However, the address table is invalidated and, therefore, failed in searching. The packet converting circuit 3011 takes the RPR MAC address of the self-node as RPR MAC SA and takes the broadcast address as RPR MAC DA to encapsulate the client packet (in this case, Unknown Unicast packet will be prepared). The ringlet selection circuit 3006 selects a ringlet according to a predetermined transport method (unidirectional flooding or bidirectional flooding) to set the TTL. And a multiplexing circuit corresponding to the selected ringlet transmits an Unknown unicast packet.

The node having received the RPR packet (Unknown unicast packet) having undergone flooding decapsulates the client packet and outputs the result from a tributary port. In addition, the node learns the address of a source RPR node of the Unknown unicast packet (RPR MAC SA) and a source address of the client packet (MAC DA) in a corresponded manner.

Specifically, the forwarding circuits 3001 and 3002 receive the Unknown unicast packet and, then, output the Unknown unicast packet to a packet converting circuit through the multiplexing circuit 3005. The packet converting circuit 3011 transmits the client packet stored in the Unknown unicast packet from the port 3012-2 of the MAC/PHY circuit 3015. In addition, the packet converting circuit 3011 causes the address table storage part 3010 to store the RPR MAC SA of Unknown unicast packet and the MAC SA of a client packet having undergone decapsulation from the Unknown unicast packet in a corresponded manner as an address table.

In the case where the interlink node 1*a* connected to an interlink 5012 in which no fault has occurred receives an Unknown unicast packet, the interlink node 1*a* transmits the decapsulated client packet as described above to the interlink node 2*a*. Similarly, in the case where the interlink node 2*a* receives an Unknown unicast packet, the interlink node 2*a* transmits the client packet to the interlink node 1*a*.

The interlink nodes 1*b* and 3*a* connected to the interlink 5011 in which a fault has occurred receive an Unknown unicast packet, decapsulate and transmit the client packet and, nevertheless, the transmission does not reach the opposite interlink node since a fault has occurred in the interlink 5011.

However, since the bypass pathway nodes 2*d* and 3*b* are set to open states, both bypass pathway node 2*d* and 3*b* transmit the client packet having been decapsulated as described above to the opposite bypass pathway node in the case of receiving an Unknown unicast packet.

Consequently, even if the basic nodes in any ring receives the client packet from a user terminal, by applying flooding as an Unknown unicast packet, the Unknown unicast packets are transmitted to the respective basic nodes belonging to the first to third rings respectively. The respective basic nodes transmit the client packet from the tributary port. Accordingly, even if the address table is invalidated, the client packet is transmitted to the user terminal being the destination. In addition, during the course, the respective nodes belonging to the first to third rings respectively cause the address table storage part 3010 to store the RPR MAC SA of the Unknown unicast packet and the MAC SA of the client packet in a corresponded manner as an address table.

The above described operations are repeated and, thereby, the information quantity stored as the address table increases so as to enable unicast transmission of the RPR packet in which the client packet is stored without carrying out flooding. In addition, instead of transmission/reception of packets with the interlink 5011, packet transmission/reception with the bypass pathway 5010 is carried out to learn the address table. Consequently, for example, in the case where a user terminal connected to the basic node 3c transmits a client packet addressed to a user terminal connected to the basic node 1d, a client packet is transmitted to a user terminal connected to the basic node 1d via the third ring, the bypass pathway 5010, the second ring, the interlink 5012 and the first ring.

Thus, according to the present embodiment, even if a fault occurs between certain two packet ring networks, communication pathway can be reestablished between those two packet ring networks through another packet ring network.

In addition, when no fault occurs in an interlink, the bypass pathway nodes 2d and 3b are in a closed state and no transmission/reception of the client packet is carried out through the bypass pathway 5010. That is, when no fault occurs in the interlink, no bypass pathway 5010 is used as a transport pathway for the client packet and no loop form packet transport pathway passing the three rings is formed. Accordingly, an occurrence of problems such as broadcast storm and redundant arrivals of a packet can be prevented.

So far, the case where a fault occurs in the interlink 5011 has been described as an example. However, operations in the case where a fault occurs in the interlink 5012 are likewise.

Second Exemplary Embodiment

For the first exemplary embodiment, the packet ring network system with two rings brought into hub connection to the first ring was described. The second exemplary embodiment can be configured by bringing three or more rings into hub connection to a first ring. That is, three or more rings including a bypass pathway node can be configured to be brought into connection to the first ring. A ring including a bypass pathway node will be described as a subring. The subring is brought into interlink connection to the first ring directly. The bypass pathway is formed between two arbitrary subrings.

Figure 17:
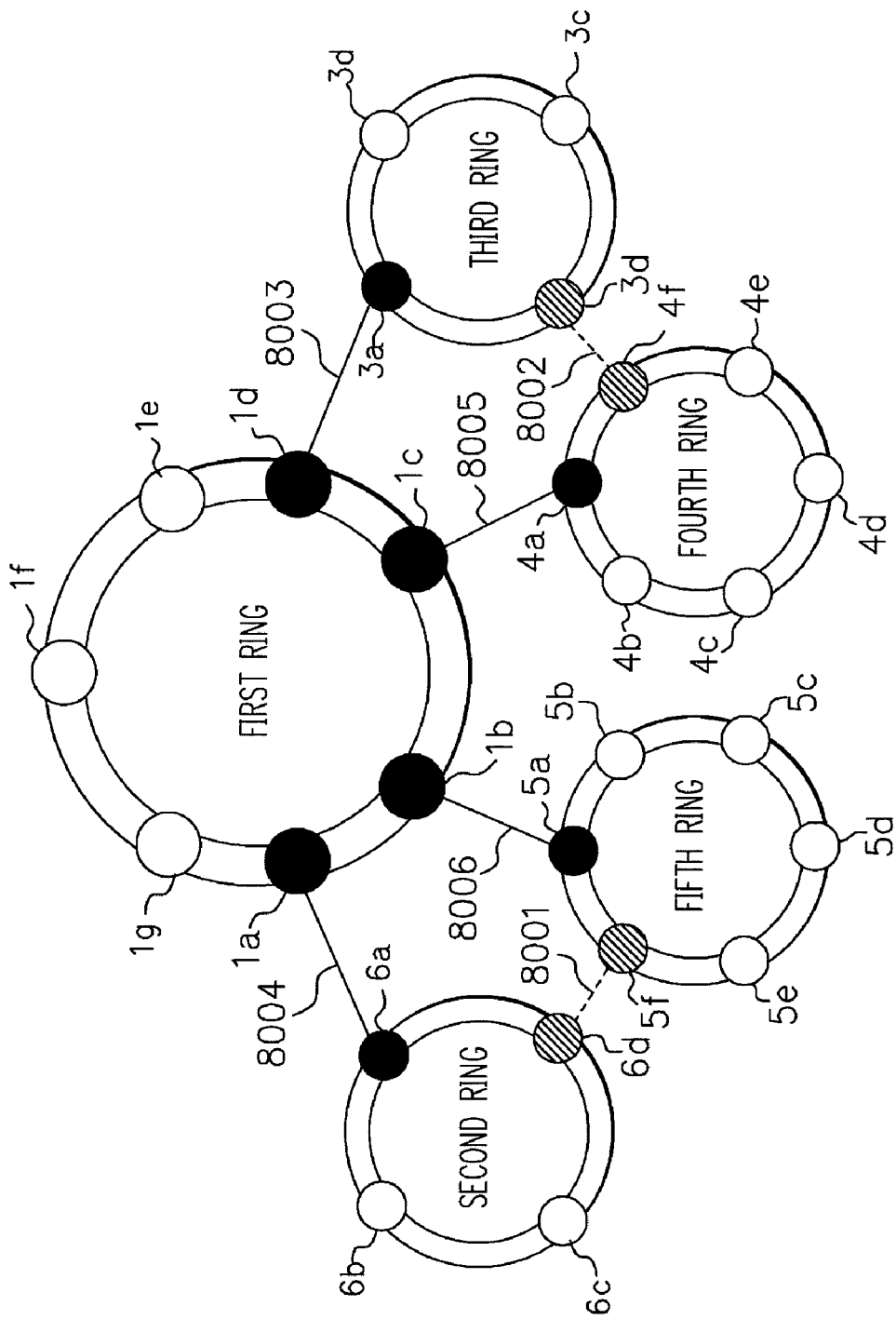
FIG. 17 is a diagram exemplifying a packet ring network system bringing four subrings into connection to a first ring in an exemplary embodiment of the present invention.

FIG. 17 exemplifies a packet ring network system configured by connecting four subrings from a second ring to a fifth ring to a first ring. The first ring includes interlink nodes 1a to 1d and basic nodes 1e to 1g. The second ring includes interlink node 6a, a bypass pathway node 6d and basic nodes 6b and 6c. The third ring includes interlink node 3a, a bypass pathway node 3d and basic nodes 3b and 3c. The fourth ring includes interlink node 4a, a bypass pathway node 4f and basic nodes 4b to 4e. The fifth ring includes interlink node 5a, a bypass pathway node 5f and basic nodes 5b to 5e.

The configuration and operations of the respective interlink nodes, the respective bypass pathway nodes and the respective basic nodes are similar to the configurations and the operations described in the first exemplary embodiment.

The interlink nodes 1a and 6a are brought into connection through an interlink 8004. The interlink nodes 1b and 5a are brought into connection through an interlink 8006. The bypass pathway nodes 6d and 5f are brought into connection through a bypass pathway 8001. When a fault occurs in any of the interlinks 8004 and 8006, the bypass pathway node 8001 is linked up thereto. That is, the node is started to be utilized as a transfer pathway of a client packet. In addition, the interlink nodes 1c and 4a are brought into connection through an interlink 8005. The interlink nodes 1d and 3a are brought into connection through an interlink 8003. The bypass pathway nodes 4f and 3d are brought into connection through a bypass pathway 8002. When a fault occurs in any of the interlinks 8005 and 8003, the bypass pathway node 8002 is linked up thereto. Operations of the respective nodes at the time of an occurrence of a fault in an interlink are similar to the operations in the first exemplary embodiment.

There is no limit in the number of subrings in the second exemplary embodiment. In the case where the number of subrings is an even number, a bypass pathway can be deployed between two subrings which are respectively configured by two arbitrary subrings respectively as a pair.

In addition, in the case where the number of subrings is an odd number, it is occasionally necessary to provide one or more subrings with a plurality of bypass pathway nodes. FIG. 18 is an explanatory diagram exemplifying a configuration in the case where three subrings are present. The first ring includes interlink nodes 1a to 1c and basic nodes 1d to 1f. The second ring includes an interlink node 2a, a bypass pathway node 2d and basic nodes 2b and 2c. The third ring includes an interlink node 3a, a bypass pathway node 3b and basic nodes 3c and 3d. The fourth ring includes an interlink node 4a, bypass pathway node 4b and 4f and basic nodes 4c to 4e.

The interlink nodes 1a and 2a are brought into connection through an interlink 9004. The interlink nodes 1b and 4a are brought into connection through an interlink 9003. The interlink nodes 1c and 3a are brought into connection through an interlink 9005. In addition, the bypass pathway nodes 2d and 4f are brought into connection through a bypass pathway node 9001. The bypass pathway nodes 3b and 4b are brought into connection through a bypass pathway node 9002.

As illustrated in FIG. 18, in the case where the number of subrings is an odd number, one or more subrings (the fourth ring in the example illustrated in FIG. 18) are provided with a plurality of bypass pathway nodes and are provided with a plurality of bypass pathways for connection to the other subrings. In that case, an interlink node inside the ring provided with a plurality of bypass pathway nodes (the interlink node 4a of the fourth ring in the example illustrated in FIG. 18) is different from the interlink node illustrated in the first exemplary embodiment for a point to be described below. Configuration and operations of the other nodes (the respective nodes except the interlink node 4a) are likewise the first exemplary embodiment.

The configuration of the interlink node 4a inside the ring provided with a plurality of bypass pathway nodes is similar to the configuration illustrated in FIG. 8. An RPR address of bypass pathway nodes 4b and 4f inside the ring to which the interlink node 4a belongs is registered in the bypass pathway node address setting part 3031. Moreover, the priority order of that RPR address (bypass pathway nodes 4b and 4f) is determined in advance. At the occasion of generating an interlink fault notifying packet (a step S4 illustrated in FIG. 12), an interlink fault notifying packet generating circuit 3033 of the interlink node 4a generates an interlink fault notifying packet addressed to an RPR address with the highest priority order and transmits the packet to the ringlet. In addition, in the case of failure in linking up in a bypass pathway node being a destination of transmission of interlink fault notifying packet, the circuit generates an interlink fault notifying packet addressed to an RPR address with the next highest priority order and transmits the packet to the ringlet. The other operations are similar to the operations of the interlink node of the first exemplary embodiment. In the case of transmitting an interlink fault notifying packet to the bypass pathway nodes 4b and 4f concurrently, four rings configure a loop of data bus to generate a broadcast storm redundant arrivals of a packet. However, by transmitting an interlink fault notifying packet addressed only to the RPR addresses with a high priority order, an occurrence of such a problem can be prevented. Here, the priority order can be determined to be high in the order of being registered in the bypass pathway node address setting part 3031. In addition, a manager wants to influence the second ring, for example, with the spread of a fault as little as possible. But in the case of demanding to avoid a state where the fourth ring is isolated from the other ring, the priority order of the RPR address of the bypass pathway node 4*b* connected to the third ring can be set to a high level. Here, the other interlink nodes can be configured likewise the interlink node 4*a*. In the case where only one RPR address is registered, the priority order of that RPR address can be determined to be the highest.

Third Exemplary Embodiment

Figure 19:
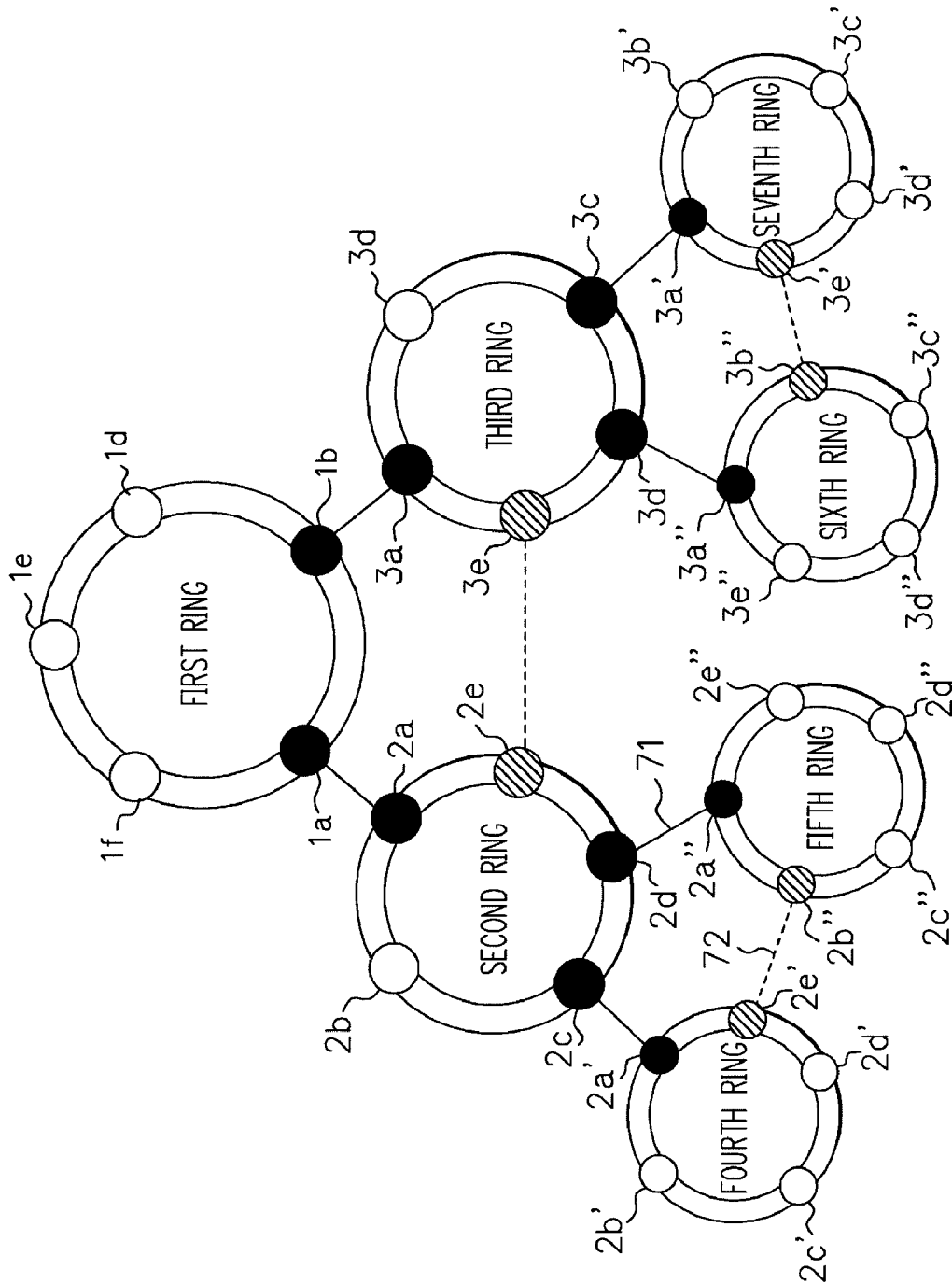
FIG. 19 is a diagram exemplifying a configuration further bringing subrings into connection to the subrings in an exemplary embodiment of the present invention.

A third embodiment of the present invention further brings a subring into connection to a subring. FIG. 19 is a diagram exemplifying a configuration further bringing subrings into connection to the subrings. For the example illustrated in FIG. 19, a second ring and a third ring are connected to the first ring as subrings. A fourth ring and a fifth ring are connected to the second ring as subrings. Similarly, a sixth ring and a seventh ring are connected to the third ring as subrings. If the subrings brought into connection through a bypass pathway to make a pair are directly connected to the same hub ring with an interlink, there is no limit in the number of the ring and the number of connection steps of the subring.

In the example illustrated in FIG. 19, the first ring includes the interlink nodes 1*a* and 1*b* and basic nodes 1*d* to 1*f*. The second ring includes the interlink nodes 2*a*, 2*c* and 2*d*, the bypass pathway node 2*e* and the basic node 2*b*. The third ring includes the interlink nodes 3*a*, 3*c* and 3*d*, the bypass pathway node 3*e* and the basic node 3*b*. The interlink nodes 1*a* and 2*a* are brought into connection through an interlink. Similarly, the interlink nodes 1*b* and 3*a* are brought into connection through an interlink. In addition, the bypass pathway nodes 2*e* and 3*e* are brought into connection through a bypass pathway.

In addition, the fourth ring includes an interlink node 2*a'*, a bypass pathway node 2*e'* and basic nodes 2*b'* to 2*d'*. The fifth ring includes the interlink node 2*a"*, the bypass pathway node 2*b"* and the basic nodes 2*c"* to 2*e"*. The interlink nodes 2*c* and 2*a'* are brought into connection through an interlink. Similarly, the interlink nodes 2*d* and 2*a"* are brought into connection through an interlink 71. In addition, the bypass pathway nodes 2*e'* and 2*b"* are brought into connection through a bypass pathway 72.

In addition, the sixth ring includes the interlink node 3*a"*, the bypass pathway node 3*b"* and the basic nodes 3*c"* to 3*e"*. The seventh ring includes the interlink node 3*a'*, the bypass pathway node 3*e'* and the basic nodes 3*b'* to 3*d'*. The interlink nodes 3*d* and 3*a"* are brought into connection through an interlink. Similarly, the interlink nodes 3*c* and 3*a'* are brought into connection through an interlink. In addition, the bypass pathway nodes 3*e'* and 3*b"* are brought into connection through a bypass pathway.

The configuration and operations of the respective interlink nodes, the respective bypass pathway nodes and the respective basic nodes illustrated in FIG. 19 are similar to the configurations and the operations described in the first exemplary embodiment.

For example, when an interlink fault occurs in the interlink 71 illustrated in FIG. 19, the bypass pathway node 72 is linked up thereto. That is, utilization as a transport pathway of the client packet will start. At that time, the rings in which flooding occurs in the RPR network due to address table invalidation are only three rings, that is, the second, the fourth and the fifth rings and the other rings are not influenced.

Fourth Exemplary Embodiment

Figure 20:
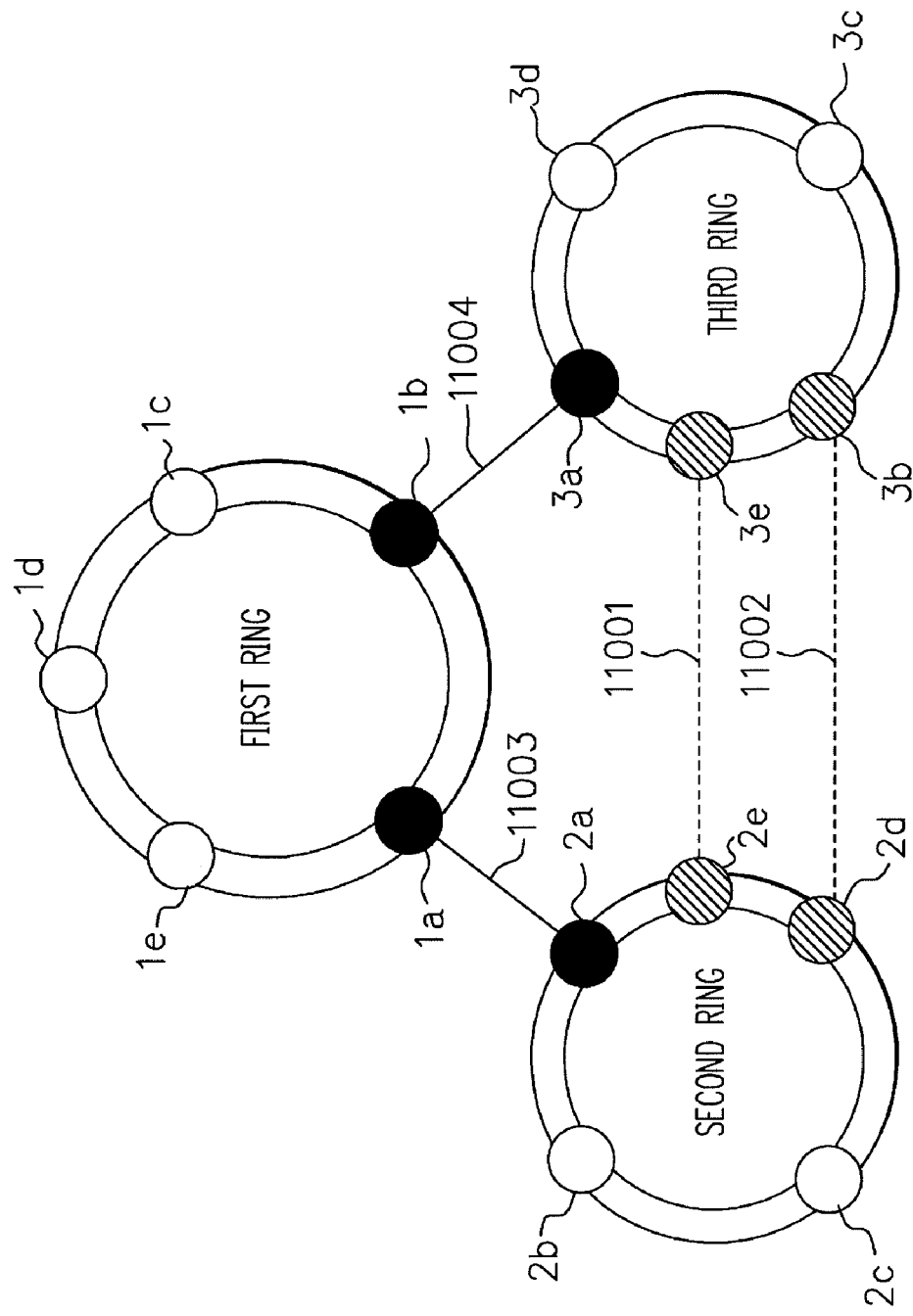
FIG. 20 is a diagram exemplifying a configuration bringing subrings into connection with a plurality of bypass pathways in an exemplary embodiment of the present invention.

Next, a fourth exemplary embodiment of the present invention will be described. The configuration can be such that subrings are brought into connection with a plurality of bypass pathways. FIG. 20 is a diagram exemplifying a configuration bringing subrings into connection with a plurality of bypass pathways. The first ring includes the interlink nodes 1*a* and 1*b* and basic nodes 1*c* to 1*e*. The second ring includes the interlink node 2*a*, the bypass pathway nodes 2*d* and 2*e* and the basic nodes 2*b* and 2*c*. The third ring includes the interlink node 3*a*, the bypass pathway nodes 3*b* and 3*e* and the basic nodes 3*c* and 3*d*. The interlink nodes 1*a* and 2*a* are brought into connection through an interlink 11003. Similarly, the interlink nodes 1*b* and 3*a* are brought into connection through an interlink 11004. In addition, the bypass pathway nodes 2*e* and 3*e* are brought into connection through a bypass pathway 11001. Similarly, the bypass pathway nodes 2*d* and 3*b* are brought into connection through a bypass pathway 11002.

Figure 21:
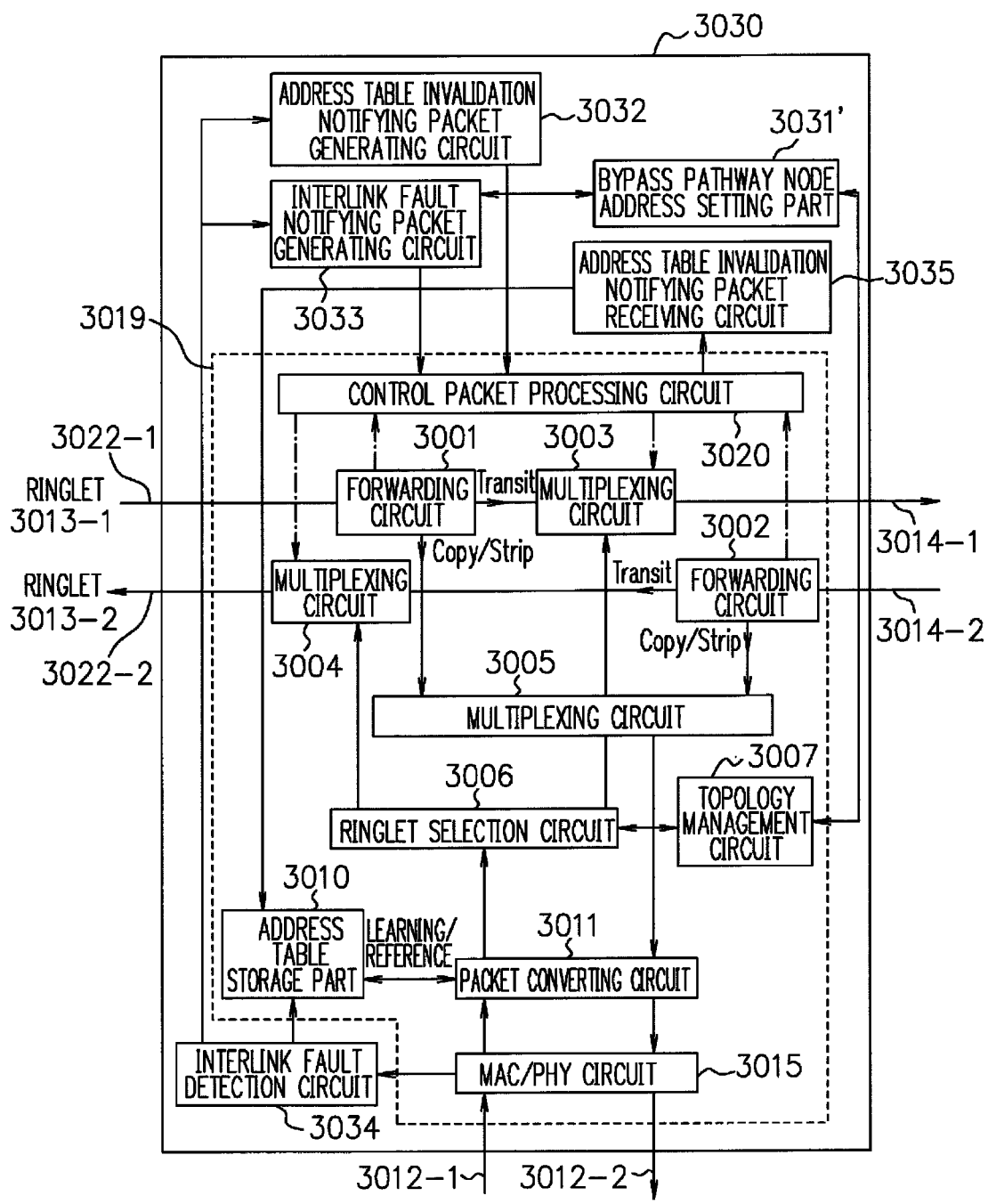
FIG. 21 is a block diagram exemplifying a configuration of an interlink node in an exemplary embodiment of the present invention.

In the fourth exemplary embodiment exemplified in FIG. 20, the configuration of the bypass pathway nodes and the basic nodes are similar to the configurations in the first exemplary embodiment. However, the present embodiment is different from the first exemplary embodiment in the bypass pathway node address setting part which the interlink node comprises. FIG. 21 is a block diagram exemplifying a configuration of an interlink node in the fourth exemplary embodiment. The same numerals and characters as in FIG. 8 designate the same components as the components of the interlink node in the first exemplary embodiment and description thereon will be omitted.

An RPR address of the respective bypass pathway nodes provided inside the RPR network to which the interlink nodes themselves belong to is registered in the bypass pathway node address setting part 3031' of the interlink nodes of the fourth exemplary embodiment. Moreover, a selection priority level of the respective bypass pathway nodes, the RPR address of which is registered, is also registered in the bypass pathway node address setting part 3031'. For example, the RPR address and the selection priority level of the bypass pathway nodes are registered for the respective bypass pathway nodes in a corresponded manner.

For the present embodiment, after an occurrence of an interlink fault, an interlink fault notifying packet generating circuit 3033 requests an RPR address of a bypass pathway node for a bypass pathway node address setting part 3031' in a step S4 (see FIG. 12). The bypass pathway node address setting part 3031' in receipt of that request refers to a topology database stored in the topology management circuit 3007 to determine whether or not an RPR address with the highest selection priority level is included as an entry in the topology database. Here, as described in the first exemplary embodiment, the topology database is generated by the control packet processing circuit 3020 receiving the TP packet and stored in the topology management circuit 3007.

If the RPR address with the highest selection priority level is included in the topology database as an entry, the bypass pathway node address setting part 3031' notifies the interlink fault notifying packet generating circuit 3033 of that RPR address.

On the other hand, in the case where the RPR address with the highest selection priority level is not included in the topology database as an entry, the bypass pathway node address setting part 3031' refers to the topology database to determine whether or not an RPR address with the next selection priority level is included as an entry in the topology database. The bypass pathway node address setting part 3031' repeats the similar operations in the order of the selection priority level until confirming the RPR address included in the topology database as an entry. If the bypass pathway node address setting part 3031' confirms the RPR address included in the topology database as an entry, the bypass pathway node address setting part 3031' notifies the interlink fault notifying packet generating circuit 3033 of that RPR address.

The interlink fault notifying packet generating circuit 3033 generates the interlink fault notifying packet addressed to the RPR address which has been notified to the bypass pathway node address setting part 3031'.

The other operations in the interlink node are similar to the operations described for the first exemplary embodiment.

The above described configurations and operations enable securement of alternative bypass pathway even if the bypass pathway node, the RPR address of which is registered in the bypass pathway node address setting part 3031' in advance, is in a state of allowing no operation as a bypass pathway due to a node fault.

Figure 22:
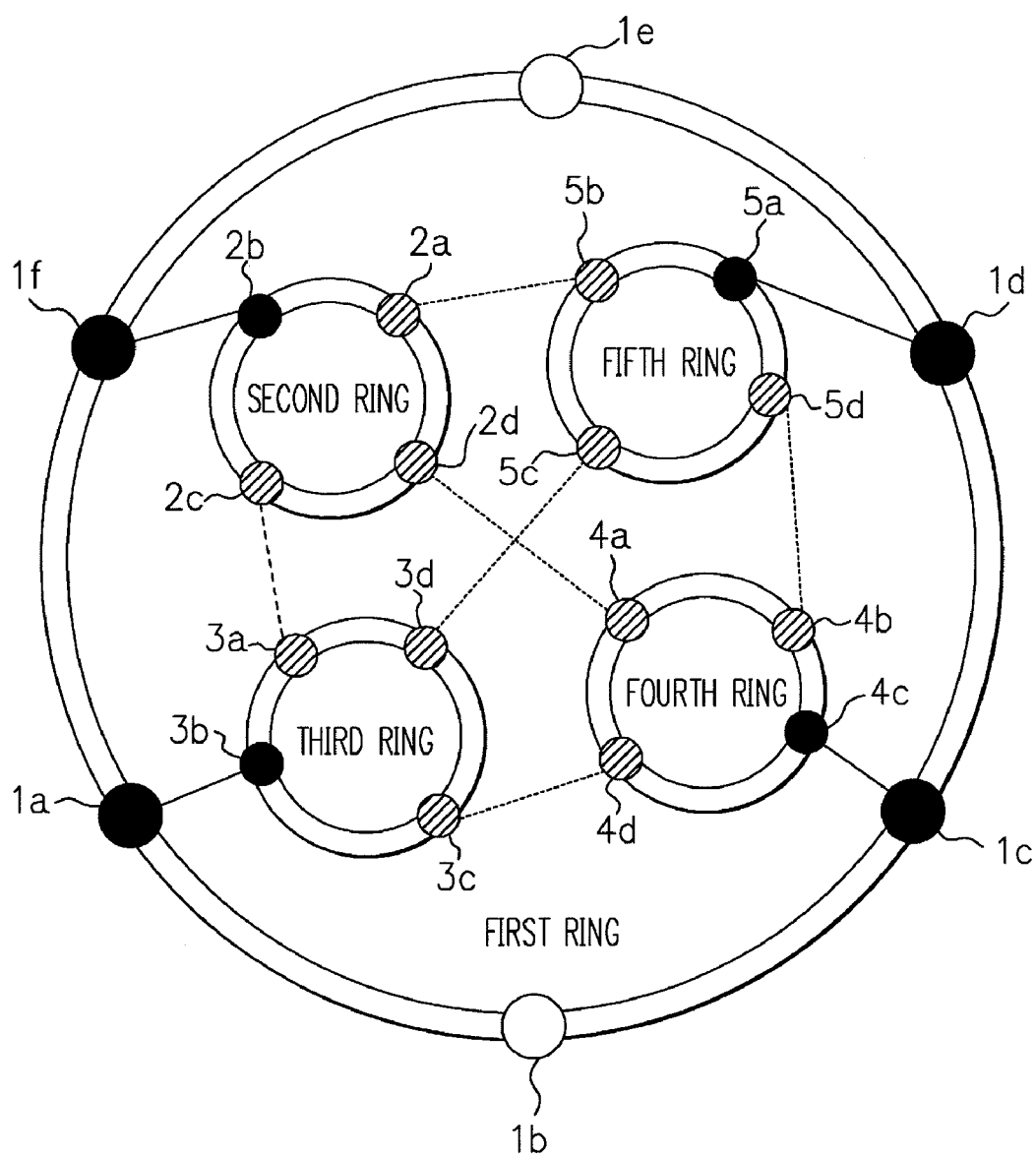
FIG. 22 is an explanatory diagram exemplifying a configuration bringing four subrings into connection to a first ring wherein subrings are connected to each other by a plurality of bypass passway in an exemplary embodiment of the present invention.

The case where the number of the bypass pathway bringing the subrings themselves into connection is two is exemplified in FIG. 20. However, the number of the bypass pathway bringing the subrings themselves into connection can be three or more. In addition, the network configuration in the fourth exemplary embodiment will not be limited to the configuration exemplified in FIG. 20. For example, the interlink node of the present embodiment can be applied to the configuration exemplified in FIG. 18 and FIG. 22. FIG. 22 exemplifies a configuration in which four subrings are connected to the first ring through an interlink and the respective subrings are connected each other with a plurality of bypass pathways. In addition, the number of the ring included in the packet ring network system will not be limited.

Fifth Exemplary Embodiment

Next, a fifth exemplary embodiment of the present invention will be described. As exemplified in FIG. 18, the present embodiment is applied to a configuration in which a plurality of bypass pathway nodes is provided in a certain subring and that subring is connected to a plurality of subrings through a plurality of bypass pathways.

Figure 23:
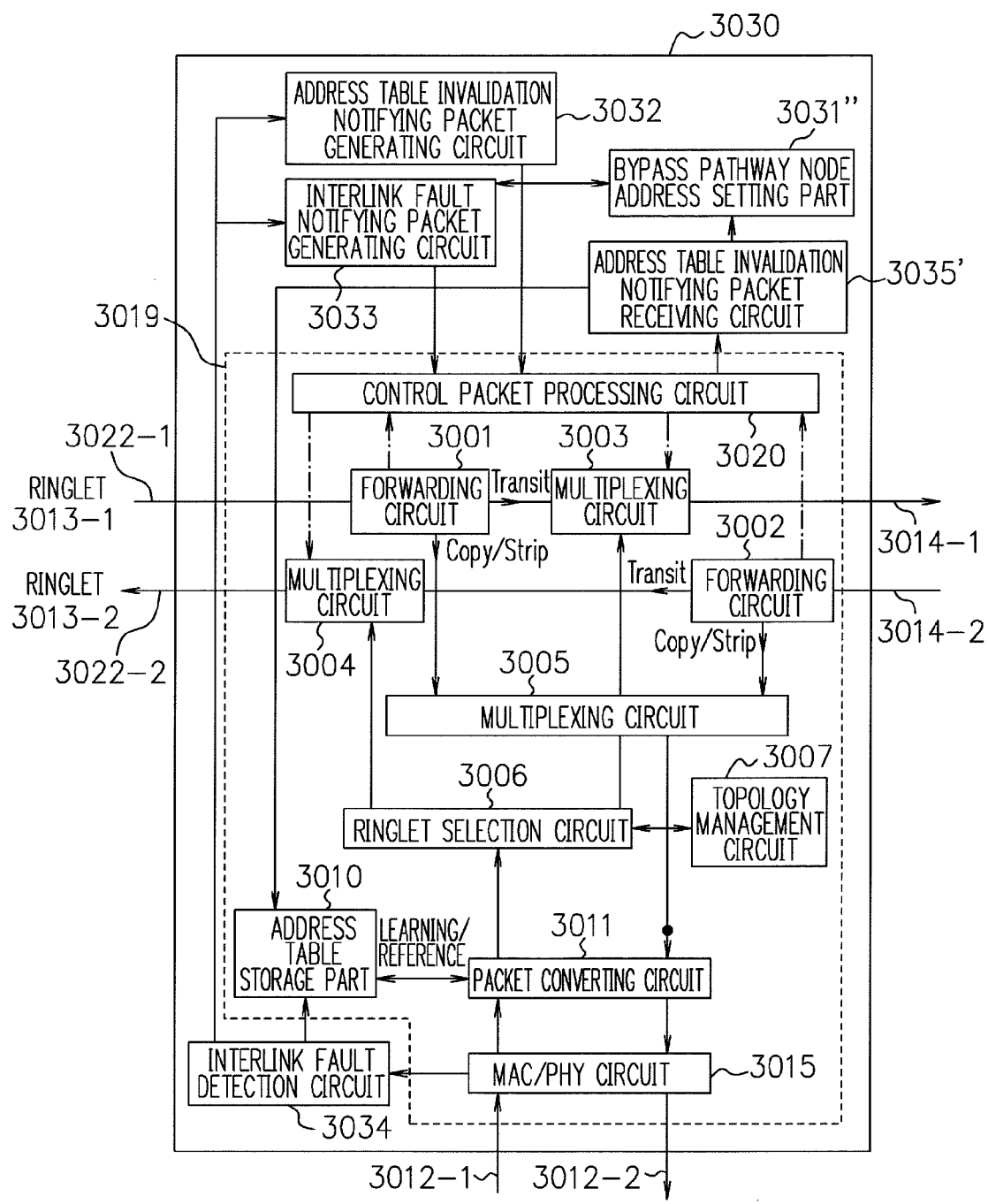
FIG. 23 is a block diagram exemplifying a configuration of an interlink node in an exemplary embodiment of the present invention.

In the fifth exemplary embodiment, configurations of the bypass pathway nodes and the basic nodes are similar to the configurations in the first exemplary embodiment. However, the fifth exemplary embodiment is different from the first exemplary embodiment in the bypass pathway node address setting part which the interlink node comprises. FIG. 23 is a block diagram exemplifying a configuration of an interlink node in the fifth exemplary embodiment. The same numerals and characters as in FIG. 8 designate the same components as the components of the interlink node in the first exemplary embodiment and description thereon will be omitted.

An RPR address of the respective bypass pathway nodes provided inside the RPR network to which the interlink nodes themselves belong to is registered in the bypass pathway node address setting part 3031" of the interlink nodes of the fifth exemplary embodiment. In addition, similar to the aspect described with an interlink 4a as an example illustrated in FIG. 18, in the second exemplary embodiment, the RPR address is registered in a bypass pathway node address setting part 3031" so that the priority order of that RPR address (bypass pathway nodes 4b and 4f) is determined in advance.

In addition, in the case of receiving the address table invalidation notifying packet, the address table invalidation notifying packet receiving circuit 3035' notifies the address table invalidation notifying packet receiving circuit 3035' of the RPR address of the source of that address table invalidation notifying packet.

The bypass pathway node address setting part 3031" receives a notice of the RPR address of the source of the address table invalidation notifying packet and, then, searches a notified RPR address from among the RPR addresses registered in itself. In the case where a corresponded address is present, the bypass pathway node address setting part 3031" deletes the notified RPR address from the RPR addresses registered in itself.

Here, at an occasion of generating an interlink fault notifying packet (step S4 illustrated in FIG. 12), the interlink fault notifying packet generating circuit 3033 generates an interlink fault notifying packet addressed to the RPR address with the highest priority order among the RPR addresses remaining as entries in the bypass pathway node address setting part 3031" and transmits the packet to the ringlet.

The other operations in the interlink node are similar to the operations described in the first exemplary embodiment.

Next, an example of the operations in the fourth exemplary embodiment will be described. For example, the RPR addresses of the bypass pathway nodes 4b and 4f are registered in advance in the bypass pathway node address setting part 3031" of the interlink node 4a exemplified in FIG. 18. In the case where an interlink fault occurs in an interlink 9005 illustrated in FIG. 18, the bypass pathway 9002 starts to be utilized as a transport pathway for the client packet. The operation hereof is similar to the operations in the first exemplary embodiment. However, in the case of receiving an address table invalidation notifying packet, the address table invalidation notifying packet receiving circuit 3035' of the interlink node 4a notifies the bypass pathway node address setting part 3031" of the RPR address of the source node thereof (the bypass pathway node 4b in the present embodiment). The bypass pathway node address setting part 3031" deletes the RPR address of the bypass pathway node 4b from the entry.

Subsequently, in the case where an interlink fault occurs in the interlink 9003, the interlink fault notifying packet generating circuit 3033 of the interlink node 4a generates an interlink fault notifying packet addressed to the RPR address with the highest priority order among the RPR addresses remaining in the bypass pathway node address setting part 3031" as entries at an occasion of generating an interlink fault notifying packet (step S4 illustrated in FIG. 12), and transmits the packet to the ringlet. In the present embodiment, the RPR address of the bypass pathway node 3b is deleted and only the RPR address of the bypass pathway node 4f remains. Accordingly, the interlink node 4a transmits an interlink fault notifying packet to a bypass pathway node 4f. Consequently, even if a multiple fault occurs in an interlink, not a bypass pathway 9002 already utilized as a packet transport pathway but the different bypass pathway 9001 is selected to be capable of starting to utilize that bypass pathway 9001 as a packet transport pathway.

Here, the operations of fifth exemplary embodiment can be applied to the address table invalidation notifying packet receiving circuit 3035 and the bypass pathway node address setting part 3031' (see FIG. 21) in the fourth exemplary embodiment. That is, also for the fourth exemplary embodiment, the address table invalidation notifying packet receiving circuit 3035 notifies the bypass pathway node address setting part 3031' of the source RPR address of the inbound address table invalidation notifying packet. The bypass pathway node address setting part 3031' can delete the notified address from the registered addresses.

For the above described respective embodiments, the case where the respective nodes belonging to the packet ring network are brought into connection with two ringlets which transport a packet in the mutually opposite directions was described. However, the respective nodes belonging to the packet ring network can be brought into connection with one ringlet.

For the above described respective embodiments, the respective types of nodes of the present invention were described to be configured by comprising the respective processing parts such as the RPR basic node part 3019. However, the node can be configured by comprising a computer and a storage apparatus in advance and, moreover, that computer operates according to programs for the nodes stored in the storage apparatus and, thereby, realizing the operation likewise the respective processing parts.

In addition, for the above described respective embodiments, the case where optical input is discontinued in the port 3012-1 of the MAC/PHY circuit 3015 and thereby the interlink fault detecting circuit 3034 detects an interlink fault was described as an example. However, the method of detecting the interlink fault will not be limited to this method. For example, the respective interlink nodes can detect an occurrence of an interlink fault based on the FCS 215 of a client packet (see FIG. 2). At an occasion of generating and transmitting a client packet, a user terminal calculates a test value corresponding to data in a portion except the FCS of that packet and adds that value to the packets as the FCS 215. At the time of decapsulating a client packet from an RPR address, the packet converting circuit 3011 of each node refers to the FCS 215 of the client packet to determine the presence of an FCS error of the client packet. That is, the circuit calculates the test value according to the portion except the FCS of the client packet to determine whether or not the result corresponds with the value of the FCS. If the test value calculated by the packet converting circuit 3011 does not corresponds with the value of the FCS, the packet converting circuit 3011 disposes the decapsulated client packet and if the value corresponds therewith, the circuit transmits the value from the MAC/PHY circuit 3015. In addition, in the case of receiving a client packet, the MAC/PHY circuit 3015 of the interlink node calculates a test value corresponding with a portion except the FCS of that client packet to determine whether or not the value corresponds with the value of the FCS. If the test value calculated based on the inbound client packet does not correspond with the FCS of that client packet, the MAC/PHY circuit 3015 notifies the interlink fault detection circuit 3034 thereof. In the case of having received that notice (a notice that the test value calculated from the client packet does not correspond with the value of the FCS), the interlink fault detection circuit 3034 determines that a fault has occurred in an interlink. Thus, with reference to the FCS of the client packet, the interlink fault can be determined to have occurred. Here, at the time of consecutively receiving, from the MAC/PHY circuit 3015, a notice that the value of the FCS does not corresponds with the value of the test value calculated from the client packet, the interlink fault detection circuit 3034 can determines that a fault has occurred in an interlink.

A case where the interlink node 1a illustrated in FIG. 7 decapsulates the client packet from the RPR packet to transmit the packet to the interlink node 2a will be described as an example. The packet converting circuit 3011 of the interlink node 1a decapsulates the client packet from the inbound RPR packet from the node inside the first ring and calculates a test value corresponding with the portions except the FCS of that client packet to determine whether or not the value corresponds with the value of the FCS. If correspondence is present, the MAC/PHY circuit 3015 of the interlink node 1a transmits that client packet to the interlink node 2a. Here, if there is no correspondence, the packet converting circuit 3011 disposes the client packet. In addition, the MAC/PHY circuit 3015 of the interlink node 2a calculates the test value corresponding with the portion except the FCS of the inbound client packet from the interlink node 1a to determine whether or not the value corresponds with the value of the FCS. In addition, if there is no correspondence, the interlink fault detection circuit 3034 is notified thereof. The interlink fault detection circuit 3034 of the interlink node 2a receives that notice and, thereby, determines that a fault has occurred in the interlink 5012.

In addition, in the case where the IEEE802.3ae is applied to communication of the client packet through the interlink, the MAC/PHY circuit 3015 of the interlink node can detect a fault of the interlink with the link fault notifying function (LFS: Link Fault Signaling) defined by the IEEE802.3ae to notify the interlink fault detection circuit 3034 of that a fault has occurred. In the case of detecting an interlink fault with the LFS function, the MAC/PHY circuit 3015 can detect a fault of both the uplink and down link on the RS (reconciliation sublayer) layer on the MAC low class layer. According to the LFS, in the case where a fault has occurred on the layer lower than the RS layer, a fault notifying packet is transmitted to the opposite interlink node so that also the MAC/PHY circuit 3015 of the interlink node transmitting the client packet can detect a fault occurrence in the interlink. However, the IEEE802.3ae is a standard for the 10G (gigabit) Ethernet (registered trademark). In the case where the IEEE802.3ae is applicable, the LFS function enables detection of an interlink fault.

The above described description discloses a configuration in which an interlink node comprises: an address table storage part inside an interlink node storing an address table specifying corresponding relation between an address of a terminal outside a packet ring network and an address of a node inside the packet ring network; a fault detecting part detecting a fault occurrence in an interlink; a bypass pathway node address registration part registering an address of the bypass pathway node in the case where a bypass pathway node belongs to the same packet ring network to which the relevant interlink node belongs; an interlink fault notifying packet transmitting part transmitting an interlink fault notifying packet notifying a fault occurrence in an interlink to an address registered in the bypass pathway node address registration part as a destination address; an invalidation requesting part inside an interlink node transmitting an address table invalidation requesting packet instructing invalidation of an address table to each node belonging to the same packet ring network as the relevant interlink node belongs to when the fault detecting part detects a fault occurrence in an interlink; an invalidation part inside an interlink node invalidating an address table of a self-node when the fault detecting part detects a fault occurrence in an interlink or in the case of receipt of an address table invalidation requesting packet from another node; and an address learning part inside an interlink node causing the address table storage part inside an interlink node to store an address of a source terminal of the client packet and an address of a source node of a packet inside the ring in a corresponded manner as an address table at the time of receiving a packet inside a ring obtained by encapsulating a client packet; and a bypass pathway node comprises: an address table storage part inside a bypass pathway node storing an address table specifying corresponding relation between an address of a terminal outside a packet ring network and an address of a node inside the packet ring network; a fault occurrence notifying part notifying a bypass pathway node inside another subpacket ring network connected to the relevant bypass pathway node through a bypass pathway of a fault occurrence in an interlink in the case of receipt of an interlink fault notifying packet from an interlink node inside the same subpacket ring network as the network in which the relevant bypass pathway node is present; a client packet transmission/reception control part starting transmission/reception of a client packet through a bypass pathway in the case of receipt of an interlink fault notifying packet from an interlink node inside the same subpacket ring network as the network in which the relevant bypass pathway node is present or in the case of receipt of a notice of a fault occurrence in an interlink from a bypass pathway node inside another subpacket ring network connected to the relevant bypass pathway node through a bypass pathway; an invalidation requesting part inside a bypass pathway node transmitting an address table invalidation requesting packet instructing invalidation of the address table to each node belonging to the same packet ring network as the relevant bypass pathway node does in the case of receipt of a notice of a fault occurrence in an interlink from a bypass pathway node inside another subpacket ring network connected to the relevant bypass pathway node through a bypass pathway; an invalidation part inside a bypass pathway node invalidating an address table of a self-node in the case of receipt of a notice of a fault occurrence in an interlink from a bypass pathway node inside another subpacket ring network connected to the relevant bypass pathway node through a bypass pathway or in the case of receipt of an address table invalidation requesting packet from another node; an address learning part inside a bypass pathway node causing the address table storage part inside the bypass pathway node to store an address of a source terminal of the client packet and an address of a source node of a packet inside the ring in a corresponded manner as an address table at the time of receiving a packet inside a ring obtained by encapsulating a client packet.

In the above described embodiment, the address table storage part inside an interlink node is realized by the address table storage part 3010 of the interlink node. The fault detecting part is realized by the interlink fault detecting circuit 3034. The bypass pathway node address registration part is realized by the bypass pathway node address setting part 3031. The interlink fault notifying packet transmitting part is realized by the interlink fault notifying packet generating circuit 3033. The invalidation requesting part inside an interlink node is realized by the address table invalidation notifying packet generating circuit 3032 of the interlink node. The invalidation part inside an interlink node is realized by the address table invalidation notifying packet receiving circuit 3035 and the interlink fault detecting circuit 3034 of the interlink node. The address learning part inside an interlink node is realized by the packet converting circuit 3011 of the interlink node. The address table storage part inside a bypass pathway node is realized by the address table storage part 3010 of the bypass pathway node. The fault occurrence notifying part is realized by the bypass pathway port open/close determination and control circuit 4044 and the keep-alive packet transmitting/receiving circuit 4045. The client packet transmission/reception control part is realized by the bypass pathway port open/close determination and control circuit 4044. The invalidation requesting part inside a bypass pathway node is realized by the address table invalidation notifying packet generating circuit 4042 of the bypass pathway node. The invalidation part inside a bypass pathway node is realized by the address table invalidation notifying packet receiving circuit 3035 of a bypass pathway node and the bypass pathway port open/close determination and control circuit 4044. The address learning part inside a bypass pathway node is realized by the packet converting circuit 3011 of a bypass pathway node.

In addition, the above described description discloses a configuration in which the priority order of the addresses of the bypass pathway nodes registered in the bypass pathway node address registration part is determined in advance; and the interlink fault notifying packet transmitting part transmits an interlink fault notifying packet to the address with the highest priority order among addresses of the bypass pathway nodes registered in the bypass pathway node address registration part of the self-node as the destination address.

In addition, the above described description discloses a configuration in which an interlink node comprises a topology database storage part storing a topology database including address of the respective nodes in a packet ring network to which the relevant interlink node belongs; and a topology database update part adding the address of the source node of the relevant control packet to the topology database at the time of receiving a predetermined control packet from a node inside a packet ring network to which the relevant interlink node belongs, wherein the priority order of the addresses of the bypass pathway nodes registered in the bypass pathway node address registration part is determined in advance and the interlink fault notifying packet transmitting part selects the addresses of the bypass pathway nodes registered in the bypass pathway node address registration part of the self-node one by one in descending order of priority and, in the case where a selected address is included in the topology database, transmits an interlink fault notifying packet to the relevant address as the destination address.

In addition, the above described description discloses a configuration in which, if there is an address corresponding with the address of the source node of the inbound address table invalidation requesting packet among the registered addresses of the bypass pathway nodes, the bypass pathway node address registration part deletes the relevant address.

In addition, the above described description discloses a configuration in which a fault occurrence notifying part notifies of a fault occurrence in an interlink by halting transmission of a keep-alive packet to a bypass pathway node inside another subpacket ring network.

As described with exemplary embodiments so far, the present invention is a packet ring network system including a plurality of packet ring networks to which nodes are brought into ring form connection so that a packet inside a ring obtained by encapsulating a client packet, which a terminal outside the packet ring network transmits, is transmitted and received in a packet ring network, wherein a first packet ring network is included; a plurality of subpacket ring networks being a packet ring network being connected to the first packet ring network through an interlink being a packet transport pathway used for client packet transport between packet ring networks is included; the interlink is provided to each of the subpacket ring networks connected to the first packet ring network; the first packet ring network and each of the subpacket ring networks comprise an interlink node being a node connected to an interlink; each of the subpacket ring networks is connected to another subpacket ring network through a bypass pathway being a packet transport pathway used for client packet transport when a fault occurs in an interlink; each of the subpacket ring networks comprises a bypass pathway node being a node connected to a bypass pathway to another subpacket ring network, and the bypass pathway node starts transport of a client packet with a bypass pathway in the case where a fault occurs in an interlink between a subpacket ring network to which a self-node belongs and a first packet ring network or in an interlink between a subpacket ring network to which a bypass pathway node connected to the self-node through a bypass pathway belongs and the first packet ring network.

The present invention with such configurations, can reestablish a communication path between two packet ring networks through another packet ring network even if a fault occurs between those two packet ring networks and can prevent occurrence of broadcast storm and redundant arrivals of a packet.

Here, the above described embodiments are preferred embodiments of the present invention and will not limit the scope of the present invention only to the above described embodiments. It is possible for those skilled in the art to modify and substitute the above described embodiments without departing the scope of the gist of the present invention to construct embodiments provided with various changes. For example, the embodiments are preferably applicable to a packet ring network system including a plurality of packet ring networks.

What is claimed is:

1. A packet ring network system including:
   a plurality of packet ring networks to which nodes are brought into ring form connection so that a packet inside a ring obtained by encapsulating a client packet, which a terminal outside the packet ring network transmits, is transmitted and received in a packet ring network, wherein a first packet ring network is included;
   a plurality of subpacket ring networks being packet ring networks connected to the first packet ring network through an interlink being a packet transport pathway used for client packet transport between the packet ring networks is included;
   the interlink is provided to each of the subpacket ring networks connected to the first packet ring network;
   the first packet ring network and each of the subpacket ring networks comprise an interlink node being a node connected to an interlink;
   each of the subpacket ring networks is connected to another subpacket ring network through a bypass pathway being a packet transport pathway used for client packet transport when a fault occurs in an interlink;
   each of the subpacket ring networks comprises a bypass pathway node being a node connected to a bypass pathway to another subpacket ring network;
   the bypass pathway node starts transport of a client packet with a bypass pathway in the case where a fault occurs in an interlink between a subpacket ring network to which a self-node belongs and the first packet ring network or in an interlink between a subpacket ring network to which a bypass pathway node connected to the self-node through a bypass pathway belongs and the first packet ring network;
   wherein the interlink node comprises:
      an address table storage part inside an interlink node storing an address table specifying corresponding relation between an address of a terminal outside a packet ring network and an address of a node inside the packet ring network;
      a fault detecting part detecting a fault occurrence in an interlink;
      a bypass pathway node address registration part registering an address of the bypass pathway node in the case where a bypass pathway node belongs to the same packet ring network to which the relevant interlink node belongs;
      an interlink fault notifying packet transmitting part transmitting an interlink fault notifying packet notifying a fault occurrence in an interlink to an address registered in the bypass pathway node address registration part as a destination address;
      an invalidation requesting part inside an interlink node transmitting an address table invalidation requesting packet instructing invalidation of an address table to each node belonging to the same packet ring network as the relevant interlink node belongs to when the fault detecting part detects a fault occurrence in an interlink;
      an invalidation part inside an interlink node invalidating an address table of a self-node when the fault detecting part detects a fault occurrence in an interlink or in the case of receipt of an address table invalidation requesting packet from another node; and
      an address learning part inside an interlink node causing the address table storage part inside an interlink node to store an address of a source terminal of the client packet and an address of a source node of a packet inside the ring in a corresponded manner as an address table at the time of receiving a packet inside a ring obtained by encapsulating a client packet, and
   wherein the bypass pathway node comprises:
      an address table storage part inside a bypass pathway node storing an address table specifying corresponding relation between an address of a terminal outside a packet ring network and an address of a node inside the packet ring network;
      a fault occurrence notifying part notifying a fault occurrence in an interlink to a bypass pathway node inside another subpacket ring network connected to the relevant bypass pathway node through a bypass pathway in the case of receipt of an interlink fault notifying packet from an interlink node inside the same subpacket ring network as the network in which the relevant bypass pathway node is present;
      a client packet transmission/reception control part starting transmission/reception of a client packet through a bypass pathway in the case of receipt of an interlink fault notifying packet from an interlink node inside the same subpacket ring network as the network in which the relevant bypass pathway is present or in the case of receipt of a notice of a fault occurrence in an interlink from a bypass pathway node inside another subpacket ring network connected to the relevant bypass pathway node through a bypass pathway;
      an invalidation requesting part inside a bypass pathway node transmitting an address table invalidation requesting packet instructing invalidation of the address table to each node belonging to the same packet ring network as the relevant bypass pathway node does in the case of receipt of a notice of a fault occurrence in an interlink from a bypass pathway node inside another subpacket ring network connected to the relevant bypass pathway node through a bypass pathway;
      an invalidation part inside a bypass pathway node invalidating an address table of a self-node in the case of receipt of a notice of a fault occurrence in an interlink from a bypass pathway node inside another subpacket ring network connected to the relevant bypass pathway node through a bypass pathway or in the case of receipt of an address table invalidation requesting packet from another node; and an address learning part inside a bypass pathway node causing the address table storage part inside the bypass pathway node to store an address of a source terminal of the client packet and an address of a source node of a packet inside the ring in a corresponded manner as an address table at the time of receiving a packet inside a ring obtained by encapsulating a client packet.

2. The packet ring network system according to claim 1, wherein the priority order of the addresses of the bypass pathway nodes registered in the bypass pathway node address registration part is determined in advance; and the interlink fault notifying packet transmitting part transmits an interlink fault notifying packet to the address in the highest priority order among addresses of the bypass pathway nodes registered in the bypass pathway node address registration part of the self-node as the destination address.

3. The packet ring network system according to claim 2, wherein, if there is an address corresponding with the address of the source node of the received address table invalidation requesting packet among the registered addresses of the bypass pathway nodes, the bypass pathway node address registration part deletes the relevant address.

4. The packet ring network system according to claim 2, wherein the fault occurrence notifying part notifies of a fault occurrence in an interlink by halting transmission of a keep-alive packet to a bypass pathway node inside another sub-packet ring network.

5. The packet ring network system according to claim 3, wherein the fault occurrence notifying part notifies of a fault occurrence in an interlink by halting transmission of a keep-alive packet to a bypass pathway node inside another sub-packet ring network.

6. The packet ring network system according to claim 1, wherein, the interlink node comprises a topology database storage part storing a topology database including addresses of the respective nodes in a packet ring network to which the relevant interlink node belongs; and a topology database update part adding the address of the source node of the relevant control packet to the topology database at the time of receiving a predetermined control packet from a node inside a packet ring network to which the relevant interlink node belongs, wherein the priority order of the addresses of the bypass pathway nodes registered in the bypass pathway node address registration part is determined in advance; and the interlink fault notifying packet transmitting part selects the addresses of the bypass pathway nodes registered in the bypass pathway node address registration part of the self-node one by one in descending order of priority and, in the case where a selected address is included in the topology database, transmits an interlink fault notifying packet to the relevant address as the destination address.

7. The packet ring network system according to claim 6, wherein, if there is an address corresponding with the address of the source node of the received address table invalidation requesting packet among the registered addresses of the bypass pathway nodes, the bypass pathway node address registration part deletes the relevant address.

8. The packet ring network system according to claim 6, wherein the fault occurrence notifying part notifies of a fault occurrence in an interlink by halting transmission of a keep-alive packet to a bypass pathway node inside another sub-packet ring network.

9. The packet ring network system according to claim 7, wherein the fault occurrence notifying part notifies of a fault occurrence in an interlink by halting transmission of a keep-alive packet to a bypass pathway node inside another sub-packet ring network.

10. The packet ring network system according to claim 1, wherein, if there is an address corresponding with the address of the source node of the received address table invalidation requesting packet among the registered addresses of the bypass pathway nodes, the bypass pathway node address registration part deletes the relevant address.

11. The packet ring network system according to claim 10, wherein the fault occurrence notifying part notifies of a fault occurrence in an interlink by halting transmission of a keep-alive packet to a bypass pathway node inside another sub-packet ring network.

12. The packet ring network system according to claim 1, wherein the fault occurrence notifying part notifies of a fault occurrence in an interlink by halting transmission of a keep-alive packet to a bypass pathway node inside another sub-packet ring network.

13. A packet transport method applied to a packet ring network system including a plurality of packet ring networks to which nodes are brought into ring form connection, and including a first packet ring network and a plurality of sub-packet ring networks being packet ring networks connected to the first packet ring network through an interlink being a packet transport pathway used for client packet transport between packet ring networks, the method comprising:

transmitting/receiving in a packet ring network a packet inside a ring obtained by encapsulating a client packet which a terminal outside the packet ring network transmits;

providing each of the subpacket ring networks connected to the first packet ring network with an interlink;

providing the first packet ring network and each of the subpacket ring networks with an interlink node being a node connected to an interlink;

connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, wherein the bypass pathway node starts transport of a client packet with a bypass pathway in the case where a fault occurs in an interlink between a subpacket ring network to which a self-node belongs and a first packet ring network or in an interlink between a subpacket ring network to which a bypass pathway node connected to the self-node through a bypass pathway belongs and the first packet ring network, wherein the interlink node:

retains an address table specifying corresponding relation between an address of a terminal outside a packet ring network and an address of a node inside the packet ring network;

detects a fault occurrence in an interlink;

stores an address of the bypass pathway node in advance in the case where a bypass pathway node belongs to the same packet ring network to which the relevant interlink node belongs;

transmits an interlink fault notifying packet notifying a fault occurrence in an interlink to an address of the bypass pathway node stored in advance as a destination address;

transmits an address table invalidation requesting packet instructing invalidation of an address table to each node belonging to the same packet ring network as the relevant interlink node belongs to when a fault occurrence is detected in an interlink;

invalidates an address table of a self-node when a fault occurrence in an interlink is detected or in the case of receipt of an address table invalidation requesting packet from another node; and retains an address of a source terminal of the client packet and an address of a source node of a packet inside the ring in a corresponded manner as an address table at the time of receiving a packet inside a ring obtained by encapsulating a client packet, and wherein the bypass pathway node:

retains an address table specifying corresponding relation between an address of a terminal outside a packet ring network and an address of a node inside the packet ring network;

notifies a fault occurrence in an interlink to a bypass pathway node inside another subpacket ring network connected to the relevant bypass pathway node through a bypass pathway in the case of receipt of an interlink fault notifying packet from an interlink node inside the same subpacket ring network as the network in which the relevant bypass pathway node is present;

starts transmission/reception of a client packet through a bypass pathway in the case of receipt of an interlink fault notifying packet from an interlink node inside the same subpacket ring network as the network in which the relevant bypass pathway is present or in the case of receipt of a notice of a fault occurrence in an interlink from a bypass pathway node inside another subpacket ring network connected to the relevant bypass pathway node through a bypass pathway;

transmits an address table invalidation requesting packet instructing invalidation of the address table to each node belonging to the same packet ring network as the relevant bypass pathway node does in the case of receipt of a notice of a fault occurrence in an interlink from a bypass pathway node inside another subpacket ring network connected to the relevant bypass pathway node through a bypass pathway;

invalidates an address table of a self-node in the case of receipt of a notice of a fault occurrence in an interlink from a bypass pathway node inside another subpacket ring network connected to the relevant bypass pathway node through a bypass pathway or in the case of receipt of an address table invalidation requesting packet from another node; and retains an address of a source terminal of the client packet and an address of a source node of a packet inside the ring in a corresponded manner as an address table at the time of receiving a packet inside a ring obtained by encapsulating a client packet.

14. An interlink node applied to a packet ring network system, including a plurality of packet ring networks to which nodes are brought into ring form connection, transmitting/receiving in a packet ring network a packet inside a ring obtained by encapsulating a client packet which a terminal outside the packet ring network transmits and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, wherein the interlink comprises:

an address table storage part inside an interlink node storing an address table specifying corresponding relation between an address of a terminal outside a packet ring network and an address of a node inside the packet ring network;

a fault detecting part detecting a fault occurrence in an interlink;

a bypass pathway node address registration part registering an address of the bypass pathway node in the case where a bypass pathway node belongs to the same packet ring network to which the relevant interlink node belongs;

an interlink fault notifying packet transmitting part transmitting an interlink fault notifying packet notifying a fault occurrence in an interlink to an address registered in the bypass pathway node address registration part as a destination address;

an invalidation requesting part inside an interlink node transmitting an address table invalidation requesting packet instructing invalidation of an address table to each node belonging to the same packet ring network as the relevant interlink node belongs to when the fault detecting part detects a fault occurrence in an interlink;

an invalidation part inside an interlink node invalidating an address table of a self-node when the fault detecting part detects a fault occurrence in an interlink or in the case of receipt of an address table invalidation requesting packet from another node; and an address learning part inside an interlink node causing the address table storage part inside an interlink node to store an address of a source terminal of the client packet and an address of a source node of a packet inside the ring in a corresponded manner as an address table at the time of receiving a packet inside a ring obtained by encapsulating a client packet.

15. The interlink node according to claim 14, wherein the priority order of the addresses of the bypass pathway nodes registered in the bypass pathway node address registration part is determined in advance; and the interlink fault notifying packet transmitting part transmits an interlink fault notifying packet to the address in the highest priority order among addresses of the bypass pathway nodes registered in the bypass pathway node address registration part of the self-node as the destination address.

16. The interlink node according to claim 15, wherein, if there is an address corresponding with the address of the source node of the received address table invalidation requesting packet among the registered addresses of the bypass pathway nodes, the bypass pathway node address registration part deletes the relevant address.

17. The interlink node according to claim 14, comprising:
a topology database storage part storing a topology database including addresses of the respective nodes in a packet ring network to which the self-node belongs; and
a topology database update part adding the address of the source node of the relevant control packet to the topology database at the time of receiving a predetermined control packet from a node inside a packet ring network to which the self-node belongs,
wherein the priority order of the addresses of the bypass pathway nodes registered in the bypass pathway node address registration part is determined in advance, and
the interlink fault notifying packet transmitting part selects the addresses of the bypass pathway nodes registered in the bypass pathway node address registration part of the self-node one by one in descending order of priority and, in the case where a selected address is included in the topology database, transmits an interlink fault notifying packet to the relevant address as the destination address.

18. The interlink node according to claim 15, wherein, if there is an address corresponding with the address of the source node of the received address table invalidation requesting packet among the registered addresses of the bypass pathway nodes, the bypass pathway node address registration part deletes the relevant address.

19. The interlink node according to claim 14, wherein, if there is an address corresponding with the address of the source node of the received address table invalidation requesting packet among the registered addresses of the bypass pathway nodes, the bypass pathway node address registration part deletes the relevant address.

20. A bypass pathway node applied to a packet ring network system, including a plurality of packet ring networks to which nodes are brought into ring form connection, transmitting/receiving in a packet ring network a packet inside a ring obtained by encapsulating a client packet which a terminal outside the packet ring network transmits and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, wherein the bypass pathway node comprises:
an address table storage part inside a bypass pathway node storing an address table specifying corresponding relation between an address of a terminal outside a packet ring network and an address of a node inside the packet ring network;
a fault occurrence notifying part notifying a fault occurrence in an interlink to a bypass pathway node inside another subpacket ring network connected to the relevant bypass pathway node through a bypass pathway in the case of receipt of an interlink fault notifying packet from an interlink node inside the same subpacket ring network as the network in which the relevant bypass pathway node is present;
a client packet transmission/reception control part starting transmission/reception of a client packet through a bypass pathway in the case of receipt of an interlink fault notifying packet from an interlink node inside the same subpacket ring network as the network in which the relevant bypass pathway is present or in the case of receipt of a notice of a fault occurrence in an interlink from a bypass pathway node inside another subpacket ring network connected to the relevant bypass pathway node through a bypass pathway;
an invalidation requesting part inside a bypass pathway node transmitting an address table invalidation requesting packet instructing invalidation of the address table to each node belonging to the same packet ring network as the relevant bypass pathway node does in the case of receipt of a notice of a fault occurrence in an interlink from a bypass pathway node inside another subpacket ring network connected to the relevant bypass pathway node through a bypass pathway;
an invalidation part inside a bypass pathway node invalidating an address table of a self-node in the case of receipt of a notice of a fault occurrence in an interlink from a bypass pathway node inside another subpacket ring network connected to the relevant bypass pathway node through a bypass pathway or in the case of receipt of an address table invalidation requesting packet from another node; and
an address learning part inside a bypass pathway node causing the address table storage part inside the bypass pathway node to store an address of a source terminal of the client packet and an address of a source node of a packet inside the ring in a corresponded manner as an address table at the time of receiving a packet inside a ring obtained by encapsulating a client packet.

21. The bypass pathway node according to claim 20, wherein the fault occurrence notifying part notifies of a fault occurrence in an interlink by halting transmission of a keep-alive packet to a bypass pathway node inside another subpacket ring network.

22. A non-transitory computer-readable medium storing a program for an interlink node applied to a packet ring network system, including a plurality of packet ring networks to which nodes are brought into ring form connection, transmitting/receiving in a packet ring network a packet inside a ring obtained by encapsulating a client packet which a terminal outside the packet ring network transmits and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, the program causing a computer provided in the interlink node to execute:
a learning process storing an address of a source terminal of the client packet and an address of a source node of a packet inside the ring in a corresponded manner as an address table at the time of receiving a packet inside a ring obtained by encapsulating a client packet;

a fault detecting process detecting a fault occurrence in an interlink;

an interlink fault notifying packet transmitting processing transmitting an interlink fault notifying packet notifying a fault occurrence in an interlink to an address stored in advance in the bypass pathway node as a destination address;

an invalidation requesting processing transmitting an address table invalidation requesting packet instructing invalidation of an address table to each node belonging to the same packet ring network as the relevant interlink node belongs to when a fault occurrence is detected in an interlink; and an invalidation processing invalidating an address table of a self-node when a fault occurrence is detected in an interlink or in the case of receipt of an address table invalidation requesting packet from another node.

23. A non-transitory computer-readable medium storing a program for a bypass pathway node applied to a packet ring network system, the packet ring network system including a plurality of packet ring networks to which nodes are brought into ring form connection, transmitting/receiving in a packet ring network a packet inside a ring obtained by encapsulating a client packet which a terminal outside the packet ring network transmits and including a first packet ring network; including a plurality of subpacket ring networks being packet ring networks connected to the first packet ring network through an interlink being a packet transport pathway used for client packet transport between packet ring networks, providing each of the subpacket ring networks connected to the first packet ring network with an interlink; providing the first packet ring network and each of the subpacket ring networks with an interlink node being a node connected to an interlink; connecting each of the subpacket ring networks to another subpacket ring network through a bypass pathway being a packet transport pathway used for client packet transport when a fault occurs in an interlink; and providing each of the subpacket ring networks with a bypass pathway node being a node connected to a bypass pathway to another subpacket ring network, the program causing a computer provided in the bypass pathway node to execute:

a learning process storing an address of a source terminal of the client packet and an address of a source node of a packet inside the ring in a corresponded manner as an address table at the time of receiving a packet inside a ring obtained by encapsulating a client packet;

a fault occurrence notifying processing notifying a fault occurrence in an interlink to a bypass pathway node inside another subpacket ring network connected to the relevant bypass pathway node through a bypass pathway in the case of receipt of an interlink fault notifying packet from an interlink node inside the same subpacket ring network as the network in which the relevant bypass pathway node is present;

a client packet transmission/reception control processing starting transmission/reception of a client packet through a bypass pathway in the case of receipt of an interlink fault notifying packet from an interlink node inside the same subpacket ring network as the network in which the relevant bypass pathway is present or in the case of receipt of a notice of a fault occurrence in an interlink from a bypass pathway node inside another subpacket ring network connected to the relevant bypass pathway node through a bypass pathway;

an invalidation requesting processing transmitting an address table invalidation requesting packet instructing invalidation of the address table to each node belonging to the same packet ring network as the relevant bypass pathway node does in the case of receipt of a notice of a fault occurrence in an interlink from a bypass pathway node inside another subpacket ring network connected to the relevant bypass pathway node through a bypass pathway; and an invalidation processing invalidating an address table of a self-node in the case of receipt of a notice of a fault occurrence in an interlink from a bypass pathway node inside another subpacket ring network connected to the relevant bypass pathway node through a bypass pathway or in the case of receipt of an address table invalidation requesting packet from another node.

* * * * *